US012811732B2

(12) United States Patent
Harrison et al.

(10) Patent No.: US 12,811,732 B2
(45) Date of Patent: Nov. 24, 2026

(54) FREQUENCY HOPPING FOR JOINT CHANNEL ESTIMATION

(71) Applicant: Telefonaktiebolaget LM Ericsson (publ), Stockholm (SE)

(72) Inventors: Robert Mark Harrison, Grapevine, TX (US); Johan Axnäs, Solna (SE); Zhipeng Lin, Nanjing (CN); Anqi He, Beijing (CN); Ling Su, Beijing (CN); Chunhui Zhang, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 129 days.

(21) Appl. No.: 18/690,649

(22) PCT Filed: Sep. 30, 2022

(86) PCT No.: PCT/IB2022/059347
§ 371 (c)(1),
(2) Date: Mar. 8, 2024

(87) PCT Pub. No.: WO2023/053085
PCT Pub. Date: Apr. 6, 2023

(65) Prior Publication Data
US 2024/0388390 A1 Nov. 21, 2024

(30) Foreign Application Priority Data
Oct. 2, 2021 (WO) ................ PCT/CN2021/122497

(51) Int. Cl.
*H04L 5/00* (2006.01)
*H04L 5/14* (2006.01)
(Continued)

(52) U.S. Cl.
CPC .......... *H04L 5/0012* (2013.01); *H04L 5/1469* (2013.01); *H04W 72/0446* (2013.01); *H04W 72/0453* (2013.01)

(58) Field of Classification Search
CPC ... H04L 5/0012; H04L 5/1469; H04L 5/0044; H04W 72/0446; H04W 72/0453; H04W 8/24
See application file for complete search history.

(56) References Cited

U.S. PATENT DOCUMENTS

2010/0158078 A1 6/2010 Ro et al.
2018/0295651 A1* 10/2018 Cao ..................... H04W 72/115
2024/0388390 A1* 11/2024 Harrison ............... H04L 5/0012

FOREIGN PATENT DOCUMENTS

EP 3713102 A1 * 9/2020 ............ H04W 72/21
GB 2578623 A 5/2020
(Continued)

OTHER PUBLICATIONS

Wilus Inc, "R1-2108159: Discussion on joint channel estimation for PUSCH," 3GPP TSG RAN WG1 #106-e, Aug. 16-27, 2021, Electronic Meeting, 6 pages.
(Continued)

*Primary Examiner* — Afshawn M Towfighi
(74) *Attorney, Agent, or Firm* — Withrow & Terranova, PLLC

(57) ABSTRACT

Systems and methods are disclosed for frequency hopping schemes that are compatible with joint channel estimation. In one embodiment, a method implemented in a User Equipment (UE) comprises determining a value of a hopping index for a first set of N consecutive slots, wherein the N is an integer greater than 1, and after the N consecutive slots, incrementing the value of the hopping index for a second set of N consecutive slots. The method further comprises, for an uplink slot within the second set of N
(Continued)

EXAMPLE OF NR TDD PATTERN consecutive slots, determining a set of physical resource blocks (PRBs) in which to transmit a physical channel from a set of frequency offsets according to the value of the hopping index for the second set of slots and transmitting the physical uplink channel in the selected set of PRBs in the uplink slot.

11 Claims, 13 Drawing Sheets

(51) Int. Cl.
*H04W 72/0446* (2023.01)
*H04W 72/0453* (2023.01)

(56) References Cited

FOREIGN PATENT DOCUMENTS

| | | | | | |
|---|---|---|---|---|---|
| WO | WO-2021161285 | A1 * | 8/2021 | ........... | H04B 7/0617 |
| WO | 2022078511 | A1 | 4/2022 | | |

OTHER PUBLICATIONS

Notice of Reasons for Refusal for Japanese Patent Application No. 2024-517559, mailed Jul. 14, 2025, 6 pages.
Author Unknown, "Technical Specification Group Radio Access Network; NR; User Equipment (UE) radio transmission and reception; Part 1: Range 1 Standalone (Release 17)," Technical Specification 38.101-1, Version 17.2.0, Jun. 2021, 3GPP Organizational Partners, 536 pages.
Author Unknown, "Technical Specification Group Radio Access Network; NR; Physical channels and modulation (Release 16)," Technical Specification 38.211, Version 16.7.0, Sep. 2021, 3GPP Organizational Partners, 134 pages.
Author Unknown, "Technical Specification Group Radio Access Network; NR; Multiplexing and channel coding (Release 16)," Technical Specification 38.212, Version 16.1.0, Mar. 2020, 3GPP Organizational Partners, 146 pages.
Author Unknown, "Technical Specification Group Radio Access Network; NR; Physical layer procedures for control (Release 16)," Technical Specification 38.213, Version 16.5.0, Mar. 2021, 3GPP Organizational Partners, 183 pages.
Author Unknown, "Technical Specification Group Radio Access Network; NR; Physical layer procedures for data (Release 16)," Technical Specification 38.214, Version 16.2.0, Jun. 2020, 3GPP Organizational Partners, 163 pages.
Author Unknown, "Technical Specification Group Radio Access Network; NR; Physical layer procedures for data (Release 17)," Technical Specification 38.214, Version 17.1.0, Mar. 2022, 3GPP Organizational Partners, 225 pages.
Author Unknown, "Technical Specification Group Radio Access Network; NR; Radio Resource Control (RRC) protocol specification (Release 16)," Technical Specification 38.331, Version 16.1.0, Jul. 2020, 3GPP Organizational Partners, 906 pages.
Author Unknown, "Technical Specification Group Radio Access Network; NR; Radio Resource Control (RRC) protocol specification (Release 16)," Technical Specification 38.331, Version 16.5.0, Jun. 2021, 3GPP Organizational Partners, 959 pages.
AT&T, et al., "R1-2207923: Updated RAN1 UE features list for Rel-17 NR after RAN1 #110 Thursday," 3GPP TSG RAN WG1 #110, Aug. 22-26, 2022, Toulouse, France, 86 pages.
AT&T, et al., "R1-2202928: Updated RAN1 UE features list for Rel-17 NR after RAN1 #108-e," 3GPP TSG RAN WG1 #108-e, Feb. 21-Mar. 3, 2022, Electronic Meeting, 76 pages.
Huawei, et al., "R1-1703868: Wf on grant-free repetitions," 3GPP Tsg Ran WG1 Meeting #88, Feb. 13-17, 2017, Athens, Greece, 2 pages.
Intel Corporation, "R1-2107604: Discussion on joint channel estimation for PUSCH," 3GPP TSG RAN WG1 #106-e, Aug. 16-27, 2021, Electronic Meeting, 9 pages.
MCC Support, "R1-2104151: Final Report of 3GPP TSG RAN WG1 #104bis-e V1.0.0," 3GPP TSG RAN WG1 Meeting #105-e, May 10-27, 2021, Electronic Meeting, 141 pages.
Qualcomm Incorporated, "R1-2107361: Joint channel estimation for PUSCH," 3GPP TSG-RAN WG1 Meeting #106-e, Aug. 16-27, 2021, Electronic Meeting, 14 pages.
RAN4, "R4-2103393: [DRAFT] Reply on LS on PUCCH and PUSCH repetition," 3GPP TSG RAN WG4 #98-e, Jan. 25-Feb. 5, 2021, Electronic Meeting, 2 pages.
Wilus Inc., "R1-2103701: Discussion on joint channel estimation for PUSCH," 3GPP TSG RAN WG1 #104b-e, Apr. 12-20, 2021, Electronic Meeting, 5 pages.
Invitation to Pay Additional Fees and Partial Search for International Patent Application No. PCT/IB2022/059347, mailed Jan. 3, 2023, 12 pages.
International Search Report and Written Opinion for International Patent Application No. PCT/IB2022/059347, mailed Feb. 24, 2023, 20 pages.
International Preliminary Report on Patentability for International Patent Application No. PCT/IB2022/059347, mailed Sep. 4, 2023, 19 pages.
China Telecom, "R1-2102161: [104-e-NR-CovEnh-03] Summary of email discussion on joint channel estimation for PUSCH," 3GPP TSG RAN WG1 Meeting #104-e, Jan. 25-Feb. 5, 2021, Electronic Meeting, 92 pages.
Notice of Submission of Opinion for Korean Patent Application No. 10-2024-7014364, mailed May 7, 2026, 10 pages.
Extended European Search Report for European Patent Application No. 26190521.0, mailed Sep. 25, 2026, 11 pages.

* cited by examiner

ENHANCED HOPPING PATTERN DERIVED FROM A SLOT NUMBER

| | | | | | | | | | | | | | | | | | | | | |
|---|---|---|---|---|---|---|---|---|---|---|---|---|---|---|---|---|---|---|---|---|
| Direction | D | D | D | S | U | D | D | S | U | U | D | D | D | S | U | D | D | S | U | U |
| Slot # | 0 | 1 | 2 | 3 | 4 | 5 | 6 | 7 | 8 | 9 | 10 | 11 | 12 | 13 | 14 | 15 | 16 | 17 | 18 | 19 |
| Hopping Counter | 0 | 0 | 0 | 0 | 0 | 1 | 1 | 1 | 1 | 1 | 2 | 2 | 2 | 2 | 2 | 0 | 0 | 0 | 0 | 0 |
| Counter in Active Slots | | | | | 0 | | | | 1 | 1 | | | | | 2 | | | | 0 | 0 |

| | | | | | | | | | | | | | | | | | | | | |
|---|---|---|---|---|---|---|---|---|---|---|---|---|---|---|---|---|---|---|---|---|
| Direction | D | D | D | S | U | D | D | S | U | U | D | D | D | S | U | D | D | S | U | U |
| Slot # | 20 | 21 | 22 | 23 | 24 | 25 | 26 | 27 | 28 | 29 | 30 | 31 | 32 | 33 | 34 | 35 | 36 | 37 | 38 | 39 |
| Hopping Counter | 1 | 1 | 1 | 1 | 1 | 2 | 2 | 2 | 2 | 2 | 0 | 0 | 0 | 0 | 0 | 1 | 1 | 1 | 1 | 1 |
| Counter in Active Slots | | | | | 1 | | | | 2 | 2 | | | | | 0 | | | | 1 | 1 |

*FIG. 3*

ENHANCED HOPPING PATTERN DERIVED FROM A SLOT NUMBER OFFSET

| | | | | | | | | | | | | | | | | | | | | |
|---|---|---|---|---|---|---|---|---|---|---|---|---|---|---|---|---|---|---|---|---|
| Direction | D | D | D | S | U | D | D | S | U | U | D | D | D | S | U | D | D | S | U | U |
| Slot # | 0 | 1 | 2 | 3 | 4 | 5 | 6 | 7 | 8 | 9 | 10 | 11 | 12 | 13 | 14 | 15 | 16 | 17 | 18 | 19 |
| Hopping Counter | 0 | 0 | 0 | 1 | 1 | 1 | 1 | 1 | 2 | 2 | 2 | 2 | 2 | 0 | 0 | 0 | 0 | 0 | 1 | 1 |
| Counter in Active Slots | | | | | 0 | | | | 2 | 2 | | | | | 0 | | | | 1 | 1 |

| | | | | | | | | | | | | | | | | | | | | |
|---|---|---|---|---|---|---|---|---|---|---|---|---|---|---|---|---|---|---|---|---|
| Direction | D | D | D | S | U | D | D | S | U | U | D | D | D | S | U | D | D | S | U | U |
| Slot # | 20 | 21 | 22 | 23 | 24 | 25 | 26 | 27 | 28 | 29 | 30 | 31 | 32 | 33 | 34 | 35 | 36 | 37 | 38 | 39 |
| Hopping Counter | 1 | 1 | 1 | 2 | 2 | 2 | 2 | 2 | 0 | 0 | 0 | 0 | 0 | 1 | 1 | 1 | 1 | 1 | 2 | 2 |
| Counter in Active Slots | | | | | 2 | | | | 0 | 0 | | | | | 1 | | | | 2 | 2 |

*FIG. 4*

CONFIGURABLE HOPPING PATTERN VS. ALTERNATIVES

| Slot # | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Direction | D | D | D | S | U | D | D | S | U | U | D | D | D | S | U | D | D | S | U | U |
| Hop # | 0 | 1 | 0 | 1 | 0 | 1 | 0 | 1 | 0 | 1 | 0 | 1 | 0 | 1 | 0 | 1 | 0 | 1 | 0 | 1 |
| Hop Every Window | | | | | 0 | | | | 1 | 1 | | | | | 0 | | | | 1 | 1 |
| Configured Hopping Pattern #1 | | | | | 0 | | | | 1 | 1 | | | | | 0 | | | | 0 | 0 |
| Configured Hopping Pattern #2 | | | | | 0 | | | | 1 | 1 | | | | | 0 | | | | 1 | 1 |
| Configured Hopping Pattern #3 | | | | | | | | | 1 | 1 | | | | | 0 | | | | 1 | 1 |

| Slot # | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|
| Direction | D | D | D | S | U | D | D | S | U | U | D | D | D | S | U | D | D | S | U | U |
| Hop # | 0 | 1 | 0 | 1 | 0 | 1 | 0 | 1 | 0 | 1 | 0 | 1 | 0 | 1 | 0 | 1 | 0 | 1 | 0 | 1 |
| Hop Every Window | | | | | 0 | | | | 1 | 1 | | | | | 0 | | | | 1 | 1 |
| Configured Hopping Pattern #1 | | | | | 1 | | | | 1 | 1 | | | | | 0 | | | | 1 | 1 |
| Configured Hopping Pattern #2 | | | | | 0 | | | | 0 | | | | | | | | | | | |
| Configured Hopping Pattern #3 | | | | | 0 | | | | 0 | 0 | | | | | | | | | | |

*FIG. 6*

FREQUENCY HOPPING FOR JOINT CHANNEL ESTIMATION

RELATED APPLICATIONS

This application is a 35 U.S.C. § 371 national phase filing of International Application No. PCT/IB2022/059347, filed Sep. 30, 2022, which claims the benefit of international patent application serial number PCT/CN2021/122497, filed Oct. 2, 2021, the disclosures of which are hereby incorporated herein by reference in their entireties.

TECHNICAL FIELD

The present disclosure relates to frequency hopping schemes for joint channel estimation.

BACKGROUND

I. Time-Division Multiplexing (TDD) Frame Structure in New Radio (NR)

Third Generation Partnership Project (3GPP) New Radio (NR) supports a highly configurable combination of downlink, uplink, and flexible slots for Time Division Duplexing (TDD). The overall TDD pattern periodicity may be as large as 20 milliseconds (ms), or 160 slots long for 120 kilohertz (kHz) subcarrier spacing. The overall TDD pattern may be specified with at most two partial patterns. Each partial TDD pattern may have a periodicity of 0.5, 0.625, 1, 1.25, 2, 2.5, 3, 4, 5, or 10 ms. The partial TDD patterns are defined by the number of downlink slots that occupy the first slots of the TDD pattern, the number of downlink symbols in a special slot that follow the downlink slots, and the number of uplink slots at the end of the pattern, the number of symbols preceding the uplink slots. If the TDD pattern has slots that are not defined as containing uplink (UL) or downlink (DL) slots or symbols, these symbols are considered as flexible, and may be dynamically indicated to be used for either UL or DL transmission.

FIG. 1 illustrates an example of the NR TDD pattern. The Radio Resource Control (RRC) parameters that configure the TDD pattern in TDD-UL-DL-ConfigCommon from 3GPP Technical Specification (TS) 38.331 V16.5.0 are illustrated in FIG. 1. The total TDD pattern is 10 slots (5 ms) long, and is defined by the partial patterns "pattern1" and "pattern2" in TDD-UL-DL-ConfigCommon, each of which is 5 slots long. The first pattern has three DL ("D") slots and one UL ("U") slot, while the second pattern has two DL slots and two UL slots. Each pattern has a special slot with 10 DL symbols, a 2 symbol gap, and two UL symbols.

II. PUSCH Repetition in NR Rel-15 and Rel-16

II.A. NR Rel-15

Slot aggregation for Physical Uplink Shared Channel (PUSCH) is supported in Rel-15 and renamed to "PUSCH Repetition Type A" in Rel-16. The name PUSCH repetition Type A is used even if there is only a single repetition, i.e., no slot aggregation. In Rel. 15, a PUSCH transmission that overlaps with DL symbols is not transmitted. For example, a document for Rel. 15 (Final Report of 3GPP TSG RAN WG1 #AH_1801 V1.0.0, 3GPP TSG RAN WG1 Meeting #92, Athens, Greece, 26 Feb.-2 Mar. 2018) discloses:

For DCI granted multi-slot transmission (PDSCH/PUSCH) vs semi-static DL/UL assignment
- If semi-static DL/UL assignment configuration of a slot has no direction confliction with scheduled PDSCH/PUSCH assigned symbols, the PDSCH/PUSCH in that slot is received/transmitted
- If semi-static DL/UL assignment configuration of a slot has direction confliction with scheduled PDSCH/PUSCH assigned symbols, the PDSCH/PUSCH transmission in that slot is not received/transmitted, i.e. the effective number of repetitions reduces.

That is, in Rel. 15, the number of repetitions is semi-statically configured by RRC parameter pusch-AggregationFactor. At most, eight (8) repetitions are supported as shown in the following from the Rel-15 specifications:

pusch-AggregationFactor ENUMERATED {n2, n4, n8}

Early termination of PUSCH repetitions was discussed in R14 NR SI in RAN1 #88 with the following agreement, but not finally standardized:

* START AGREEMENT*
R1-1703868 WF on grant-free repetitions Huawei, HiSilicon, Nokia, ABS, ZTE, ZTE Microelectronics, CATT, Convida Wireless, CATR, OPPO, Inter Digital, Fujitsu
Agreements:
For UE configured with K repetitions for a TB transmission with/without grant, the UE can continue repetitions (FFS can be different RV versions, FFS different MCS) for the TB until one of the following conditions is met
If an UL grant is successfully received for a slot/mini-slot for the same TB
FFS: How to determine the grant is for the same TB
FFS: An acknowledgement/indication of successful receiving of that TB from gNB
The number of repetitions for that TB reaches K
FFS: Whether it is possible to determine if the grant is for the same TB
Note that this does not assume that UL grant is scheduled based on the slot whereas grant free allocation is based on mini-slot (vice versa)
Note that other termination condition of repetition may apply
* END AGREEMENT*

II.B. NR Rel-16

A new repetition format, "PUSCH repetition Type B," is supported in Rel-16. For this new repetition format, the PUSCH repetition allows back-to-back repetition of PUSCH transmissions. The biggest difference between the "PUSCH repetition Type A" and "PUSCH repetition Type B" is that the repetition Type A only allows a single repetition in each slot, with each repetition occupying the same symbols. Using this format with a PUSCH length shorter than 14 introduces gaps between repetitions, increasing the overall latency. The other change compared to Rel-15 is how the number of repetitions is signaled. In Rel-15, the number of repetitions is semi-statically configured, while in Rel-16 the number of repetitions can be indicated dynamically in Downlink Control Information (DCI). This applies both to dynamic grants and configured grants type 2.

In NR Rel-16, invalid symbols for PUSCH repetition Type B include reserved UL resources. The invalid symbol pattern indicator field is configured in the scheduling DCI. Segmentation occurs around symbols that are indicated as DL by the semi-static TDD pattern and invalid symbols. The following shows the signaling of number of repetitions.

For PUSCH repetition Type A, when transmitting PUSCH scheduled by DCI format 0_1 or 0_2 in Physical Downlink Control Channel (PDCCH) with Cyclic Redundancy Check (CRC) scrambled with Cell Radio Network Temporary Identifier (C-RNTI), Modulation and Coding Scheme C-RNTI (MCS-C-RNTI), or Configured Scheduling Radio Network Temporary Identifier (CS-RNTI) with New Data Indicator (NDI) equal to 1, 3GPP TS 38.214 V16.2.0 discloses that the number of repetitions K is determined as described in the following excerpt:

* START EXCERPT FROM 3GPP TS 38.214* if numberofrepetitions is present in the resource allocation table, the number of repetitions K is equal to numberofrepetitions;
elseif the UE is configured with pusch-AggregationFactor, the number of repetitions K is equal to pusch-AggregationFactor;
otherwise K = 1.

* END EXCERPT FROM 3GPP TS 38.214*

In the following excerpt, 3GPP TS 38.212 V16.1.0 discloses the following format of DCI0_1:

* START EXCERPT FROM 3GPP TS 38.212 *

Time domain resource assignment - 0, 1, 2, 3, 4, 5, or 6 bits
If the higher layer parameter PUSCH-TimeDomainResourceAllocationList-ForDCIformat0_1 is not configured and if the higher layer parameter pusch-TimeDomainAllocationList is configured, 0, 1, 2, 3, or 4 bits as defined in Clause 6.1.2.1 of [6, TS38.214]. The bitwidth for this field is determined as $\lceil \log_2(I) \rceil$ bits, where I is the number of entries in the higher layer parameter pusch-TimeDomainAllocationList or pusch-TimeDomainAllocationList-r16;
If the higher layer parameter PUSCH-TimeDomainResourceAllocationList-ForDCIformat0_1 is configured, 0, 1, 2, 3, 4, 5 or 6 bits as defined in Clause 6.1.2.1 of [6, TS38.214]. The bitwidth for this field is determined as $\lceil \log_2(I) \rceil$ bits, where I is the number of entries in the higher layer parameter PUSCH-Time DomainResourceAllocationList-ForDCIformat0_1;
otherwise the bitwidth for this field is determined as $\lceil \log_2 (I) \rceil$ bits, where I is the number of entries in the default table.

* END EXCERPT FROM 3GPP TS 38.212 *

Also, 3GPP 38.331 V16.1.0 discloses the following information element:

* START EXCERPT FROM 3GPP TS 38.331 *

PUSCH-Config information element

```
pusch-TimeDomainAllocationList              SetupRelease { PUSCH-
TimeDomainResourceAllocationList }
pusch-AggregationFactor                     ENUMERATED { n2, n4, n8 }
OPTIONAL,   -- Need S
pusch-TimeDomainAllocationListForDCI-Format0-1-r16   SetupRelease
{ PUSCH-TimeDomainResourceAllocationList-r16 }
pusch-TimeDomainAllocationListForDCI-Format0-2-r16   SetupRelease
{ PUSCH-TimeDomainResourceAllocationList-r16 }
```

PUSCH-TimeDomainResourceAllocation information element

```
-- ASN1START
-- TAG-PUSCH-TIMEDOMAINRESOURCEALLOCATIONLIST-START
PUSCH-TimeDomainResourceAllocationList ::=   SEQUENCE
(SIZE(1..maxNrofUL-Allocations)) OF PUSCH-
TimeDomainResourceAllocation
PUSCH-TimeDomainResourceAllocation ::=   SEQUENCE {
    k2                                  INTEGER(0..32)
OPTIONAL,   -- Need S
    mappingType                         ENUMERATED {typeA,
typeB},
    startSymbolAndLength                INTEGER (0..127)
}
PUSCH-TimeDomainResourceAllocationList-r16 ::=   SEQUENCE
(SIZE(1..maxNrofUL-Allocations-r16)) OF PUSCH-
TimeDomainResourceAllocation-r16
PUSCH-TimeDomainResourceAllocation-r16 ::=   SEQUENCE {
    k2-r16                                  INTEGER(0..32)
OPTIONAL,   -- Need S
    puschAllocationList-r16                 SEQUENCE
(SIZE(1..maxNrofMultiplePUSCHs-r16)) OF PUSCH-Allocation-r16,
      ...
}
```

-continued

```
PUSCH-Allocation-r16 ::=   SEQUENCE
    mappingType-r16                               ENUMERATED {typeA,
typeB}                    OPTIONAL,       -- Cond NotFormat01-02-Or-
TypeA
    startSymbolAndLength-r16                      INTEGER (0..127)
OPTIONAL,   -- Cond NotFormat 01-02-Or-TypeA
    startSymbol-r16                               INTEGER (0..13)
OPTIONAL,   -- Cond RepTypeB
    length-r16                                    INTEGER (1..14)
OPTIONAL,   -- Cond RepTypeB
    numberOfRepetitions-r16                       ENUMERATED {n1, n2,
n3, n4, n7, n8, n12, n16} OPTIONAL,      -- Cond Format01-02
    ...
}
-- TAG-PUSCH-TIMEDOMAINRESOURCEALLOCATIONLIST-STOP
-- ASN1STOP
maxNrofUL-Allocations                  INTEGER ::= 16      --
Maximum number of PUSCH time domain resource allocations.
maxNrofUL-Allocations-r16              INTEGER ::= 64      --
Maximum number of PUSCH time domain resource allocations
                    *** END EXCERPT FROM 3GPP TS 38.331 ***
```

III. Frequency Hopping Mechanism and Signaling

In NR up to Rel-16, different frequency hopping types are supported for multi-slot PUSCH. More specifically, intra-slot and inter-slot frequency hopping are supported for the PUSCH repetition Type A and inter-slot frequency hopping and inter-repetition frequency hopping are supported for the PUSCH repetition Type B. The two types of PUSCH repetition apply to PUSCH with dynamic grant and Type-1/2 configured grant. Indication on whether frequency hopping is enabled, the type of frequency hopping, and frequency hopping offset lists are RRC configured. For PUSCH with dynamic grant and Type 2 configured grant, the frequency hopping flag in the DCI field further activates the frequency hopping and Frequency Domain Resource Allocation (FDRA) indicates one offset list. For Type 1 configured grant PUSCH, the frequency hopping activation and one frequency hopping offset is RRC configured.

The number of configurable frequency hopping offsets depends on BandWidth Part (BWP) size, with four at maximum. When the size of the active BWP is less than 50 Physical Resource Blocks (PRBs), one of two higher layer configured offsets is indicated in the UL grant. When the size of the active BWP is equal to or greater than 50 PRBs, one of four higher layer configured offsets is indicated in the UL grant.

For the PUSCH repetition Type A, in case of intra-slot frequency hopping, the starting Resource Block (RB) in each hop is given by:

$$RB_{start} = \begin{cases} RB_{start} & i = 0 \\ (RB_{start} + RB_{offset}) \bmod N_{BWP}^{size} & i = 1 \end{cases},$$

where i=0 and i=1 are the first hop and the second hop respectively, and $RB_{start}$ is the starting RB within the UL BWP, as calculated from the resource block assignment information of resource allocation type 1 (described in clause 6.1.2.2.2 of 3GPP TS 32.213) or as calculated from the resource assignment for MsgA PUSCH (described in 3GPP TS 38.213) and $RB_{offset}$ is the frequency offset in RBs between the two frequency hops. The number of symbols in the first hop is given by $$\lfloor N_{symb}^{PUSCH,s}/2 \rfloor,$$

the number of symbols in the second hop is given by $$N_{symb}^{PUSCH,s} - \lfloor N_{symb}^{PUSCH,s}/2 \rfloor, \text{ where } N_{symb}^{PUSCH,s}$$

is the length of the PUSCH transmission in OFDM symbols in one slot.

For the PUSCH repetition Type A, in case of inter-slot frequency hopping, the starting RB during slot $$n_s^{\mu}$$

is given by:

$$RB_{start}(n_s^{\mu}) = \begin{cases} RB_{start} & n_s^{\mu} \bmod 2 = 0 \\ (RB_{start} + RB_{offset}) \bmod N_{BWP}^{size} & n_s^{\mu} \bmod 2 = 1 \end{cases},$$

where $$n_s^{\mu}$$

is the current slot number within a radio frame, where a multi-slot PUSCH transmission can take place, $RB_{start}$ is the starting RB within the UL BWP, as calculated from the resource block assignment information of resource allocation type 1 (described in Clause 6.1.2.2.2 of 3GPP TS 32.213) and $RB_{offset}$ is the frequency offset in RBs between the two frequency hops.

The PUSCH repetition Type B supports inter-repetition FH and inter-slot FH. Inter-repetition FH is per nominal repetition. In case of inter-repetition frequency hopping, the starting Resource Block (RB) for an actual repetition within the n-th nominal repetition (as defined in Clause 6.1.2.1 of 3GPP TS 32.213) is given by:

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases},$$

where RBstart is the starting RB within the UL BWP, as calculated from the resource block assignment information of resource allocation type 1 (described in Clause 6.1.2.2.2 of 3GPP TS 32.213) and RBoffset is the frequency offset in RBs between the two frequency hops.

3GPP TS 38.331 V16.1.0 discloses the following:

* START EXCERPT FROM 3GPP TS 38.331 *

PUSCH-Config information element

```
PUSCH-Config ::=                         SEQUENCE {
     frequencyHopping                            ENUMERATED
{intraSlot, interSlot}
OPTIONAL,       -- Need S
     frequencyHoppingOffsetLists                 SEQUENCE (SIZE
(1..4)) OF INTEGER (1..maxNrofPhysicalResourceBlocks−1)
OPTIONAL,       -- Need M
     frequencyHoppingForDCI-Format0-2-r16
CHOICE {
          pusch-RepTypeA
ENUMERATED {intraSlot, interSlot},
          pusch-RepTypeB
ENUMERATED {interRepetition, interSlot}
     }
OPTIONAL,       -- Need S
     frequencyHoppingOffsetListsForDCI-Format0-2-r16 SetupRelease
{ FrequencyHoppingOffsetListsForDCI-Format0-2-r16} OPTIONAL,   --
Need M
     frequencyHoppingForDCI-Format0-1-r16               ENUMERATED
{interRepetition, interSlot}                  OPTIONAL,       -- Cond
RepTypeB
}
FrequencyHoppingOffsetListsForDCI-Format0-2-r16 ::=   SEQUENCE
(SIZE (1..4)) OF INTEGER (1..maxNrofPhysicalResourceBlocks−1)
```

frequencyHopping
The value intraSlot enables 'Intra-slot frequency hopping' and the value interSlot enables 'Inter-slot frequency hopping'. If the field is absent, frequency hopping is not configured for 'pusch-RepTypeA' (see TS 38.214 [19], clause 6.3). The field frequencyHopping applies to DCI format 0_0 and 0_1 for 'pusch-RepTypeA'.
frequencyHoppingForDCI-Format0-1
Indicates the frequency hopping scheme for DCI format 0_1 when pusch-RepTypeIndicatorForDCI-Format0-1 is set to 'pusch-RepTypeB', The value interRepetition enables 'Inter-repetition frequency hopping', and the value interSlot enables 'Inter-slot frequency hopping'. If the field is absent, frequency hopping is not configured for DCI format 0_1 (see TS 38.214 [19], clause 6.1).
frequencyHoppingForDCI-Format0-2
Indicate the frequency hopping scheme for DCI format 0_2. The value intraSlot enables 'intra-slot frequency hopping', and the value interRepetition enables 'Inter-repetition frequency hopping', and the value interSlot enables 'Inter-slot frequency hopping'. When pusch-RepTypeIndicatorForDCI-Format0-2 is set to 'pusch-RepTypeA', the frequency hopping scheme can be chosen between 'intra-slot frequency hopping and 'inter-slot frequency hopping' if enabled. When pusch-RepTypeIndicatorForDCI-Format0-2 is set to 'pusch-RepTypeB', the frequency hopping scheme can be chosen between 'inter-repetition frequency hopping' and 'inter-slot frequency hopping' if enabled. If the field is absent, frequency hopping is not configured for DCI format 0_2 for 'pusch-RepTypeB' (see TS 38.214 [19], clause 6.3).
frequencyHoppingOffsetLists, frequencyHoppingOffsetListsForDCI-Format0-2
Set of frequency hopping offsets used when frequency hopping is enabled for granted transmission (not msg3) and type 2 configured grant activation (see TS 38.214 [19], clause 6.3). The field frequencyHoppingOffsetLists applies to DCI format 0_0 and DCI format 0_1 and the field frequencyHoppingOffsetListsForDCI-Format0-2 applies to DCI format 0_2 (see TS 38.214 [19], clause 6.3).

ConfiguredGrantConfig information element

```
-- ASN1START
-- TAG-CONFIGUREDGRANTCONFIG-START
ConfiguredGrantConfig ::=                SEQUENCE
     frequencyHopping                            ENUMERATED {intraSlot,
interSlot}                                                OPTIONAL,       --
Need S
```

-continued

```
rrc-ConfiguredUplinkGrant                    SEQUENCE {
        timeDomainOffset                          INTEGER (0..5119),
        timeDomainAllocation                      INTEGER (0..15),
        frequencyDomainAllocation                 BITSTRING
(SIZE(18)) ,
        antennaPort                               INTEGER (0..31),
        dmrs-SeqInitialization                    INTEGER (0..1)
OPTIONAL,       -- Need R
        precodingAndNumberOfLayers                INTEGER (0..63),
        srs-ResourceIndicator                     INTEGER (0..15)
OPTIONAL,       -- Need R
        mcsAndTBS                                 INTEGER (0..31),
        frequencyHoppingOffset                    INTEGER (1..
maxNrofPhysicalResourceBlocks−1)
OPTIONAL,       -- Need R
        pathlossReferenceIndex                    INTEGER
(0..maxNrofPUSCH-PathlossReferenceRSs−1),
        ...,
        [[
        pusch-RepTypeIndicator-r16                ENUMERATED {pusch-
RepTypeA, pusch-RepTypeB}                                 OPTIONAL,
-- Need M
        frequencyHoppingPUSCH-RepTypeB-r16        ENUMERATED
{interRepetition, interSlot}
OPTIONAL,       -- Cond RepTypeB
        timeReferenceSFN-r16                      ENUMERATED {sfn512}
OPTIONAL        -- Need S
        ]]
```

frequencyHopping
The value intraSlot enables 'Intra-slot frequency hopping' and the value interSlot enables 'Inter-slot frequency hopping'. If the field is absent, frequency hopping is not configured. The field frequencyHopping applies to configured grant for 'pusch-RepTypeA' (see TS 38.214 [19], clause 6.3.1).
frequencyHoppingOffset
Frequency hopping offset used when frequency hopping is enabled (see TS 38.214 [19], clause 6.1.2 and clause 6.3).
frequencyHoppingPUSCH-RepTypeB
Indicates the frequency hopping scheme for Type 1 CG when pusch-RepTypeIndicator is set to 'pusch-RepTypeB' (see TS 38.214 [19], clause 6.1). The value interRepetition enables 'Inter-repetition frequency hopping', and the value interSlot enables 'Inter-slot frequency hopping'. If the field is absent, the frequency hopping is not enabled for Type 1 CG.

PUCCH-Config information element

```
PUCCH-FormatConfig ::=                        SEQUENCE {
     interslotFrequencyHopping                     ENUMERATED {enabled}
OPTIONAL, -- Need R
     additionalDMRS                                ENUMERATED {true}
OPTIONAL, -- Need R
     maxCodeRate                                   PUCCH-MaxCodeRate
OPTIONAL, -- Need R
     nrofSlots                                     ENUMERATED {n2, n4, n8}
OPTIONAL, -- Need S
     pi2BPSK                                       ENUMERATED {enabled}
OPTIONAL, -- Need R
     simultaneousHARQ-ACK-CSI                      ENUMERATED {true}
OPTIONAL -- Need R
}
PUCCH-Resource ::=                            SEQUENCE {
     pucch-ResourceId                              PUCCH-ResourceId,
     startingPRB                                   PRB-Id,
     intraSlotFrequencyHopping                     ENUMERATED { enabled
}                                                          OPTIONAL, --
Need R
     secondHopPRB                                  PRB-Id
OPTIONAL, -- Need R
     format                                        CHOICE {
          format0                                       PUCCH-format0,
          format1                                       PUCCH-format1,
          format2                                       PUCCH-format2,
          format3                                       PUCCH-format3,
          format4                                       PUCCH-format4
     }
}
```

-continued

| PUCCH-FormatConfig field descriptions |
|---|
| interslotFrequencyHopping<br>If the field is present, the UE enables inter-slot frequency hopping when PUCCH Format 1, 3 or 4 is repeated over multiple slots. For long PUCCH over multiple slots, the intra and inter slot frequency hopping cannot be enabled at the same time for a UE. The field is not applicable for format 2. See TS 38.213 [13], clause 9.2.6. |
| PUCCH-Resource, PUCCH-ResourceExt field descriptions |
| intraSlotFrequencyHopping<br>Enabling intra-slot frequency hopping, applicable for all types of PUCCH formats. For long PUCCH over multiple slots, the intra and inter slot frequency hopping cannot be enabled at the same time for a UE. See TS 38.213 [13], clause 9.2.1. |
| *** END EXCERPT FROM 3GPP TS 38.331 *** |

Also, 3GPP 38.212 V16.1.0 discloses that in Format 0_0:

* START EXCERPT FROM 3GPP TS 38.212 *

Frequency domain resource assignment - $\lceil \log_2(N_{RB}^{UL,BWP}(N_{RB}^{UL,BWP}+1)/2) \rceil$ bits if neither of the higher layer parameters useInterlacePUSCH-Common and userInterlacePUSCH-Dedicated is configured, where $N_{RB}^{UL,BWP}$ is defined in clause 7.3.1.0

For PUSCH hopping with resource allocation type 1:

$N_{UL\_hop}$ MSB bits are used to indicate the frequency offset according to Clause 6.3 of [6, TS 38.214], where $N_{UL\_hop}=1$ if the higher layer parameter frequencyHoppingOffsetLists contains two offset values and $N_{UL\_hop}=2$ if the higher layer parameter frequencyHoppingOffsetLists contains four offset values $\lceil \log_2(N_{RB}^{UL,BWP}(N_{RB}^{UL,BWP}+1)/2) \rceil - N_{UL\_hop}$ bits provides the frequency domain resource allocation according to Clause 6.1.2.2.2 of [6, TS 38.214]

Frequency hopping flag - 1 bit according to Table 7.3.1.1.1-3, as defined in Clause 6.3 of [6, TS 38.214]

* END EXCERPT FROM 3GPP TS 38.212 *

Further, 3GPP 38.212 V16.1.0 discloses that in Format 0_1 and Format 0_2:

* START EXCERPT FROM 3GPP TS 38.212 *

Frequency domain resource assignment - number of bits determined by the following, where $N_{RB}^{UL,BWP}$ is the size of the active UL bandwidth part:

If higher layer parameter useInterlacePUSCH-Dedicated-r16 is not configured

For resource allocation type 1, the $\lceil \log_2(N_{RB}^{UL,BWP}(N_{RB}^{UL,BWP}+1)/2) \rceil$ *LSBs* provide the resource allocation as follows:

For PUSCH hopping with resource allocation type 1:

$N_{UL\_hop}$ MSB bits are used to indicate the frequency offset according to Clause 6.3 of [6, TS 38.214], where $N_{UL\_hop}=1$ if the higher layer parameter frequencyHoppingOffsetLists contains two offset values and $N_{UL\_hop}=2$ if the higher layer parameter frequencyHoppingOffsetLists contains four offset values $\lceil \log_2(N_{RB}^{UL,BWP}(N_{RB}^{UL,BWP}+1)/2) \rceil - N_{UL\_hop}$ bits provides the frequency domain resource allocation according to Clause 6.1.2.2.2 of [6, TS 38.214]

For non-PUSCH hopping with resource allocation type 1:

$\lceil \log_2(N_{RB}^{UL,BWP}(N_{RB}^{UL,BWP}+1)/2) \rceil$ bits provides the frequency domain resource allocation according to Clause 6.1.2.2.2 of [6, TS 38.214]

-continued

Frequency hopping flag - 0 or 1 bit:
0 bit if only resource allocation type 0 is configured, or if the higher layer parameter frequencyHopping is not configured and the higher layer parameter pusch-RepTypeIndicatorForDCI-Format0-1-r16 is not configured to pusch-RepTypeB, or if the higher layer parameter frequencyHoppingForDCI-Format0-1-r16 is not configured and pusch-RepTypeIndicatorForDCI-Format0-1-r16 is configured to pusch-RepTypeB, or if only resource allocation type 2 is configured;
1 bit according to Table 7.3.1.1.1-3 otherwise, only applicable to resource allocation type 1, as defined in Clause 6.3 of [6, TS 38.214].

Table 7.3.1.1.1-3: Frequency hopping indication

| Bit field mapped to index | PUSCH frequency hopping |
|---|---|
| 0 | Disabled |
| 1 | Enabled |

* END EXCERPT FROM 3GPP TS 38.212 *

IV. Time Domain Windows for Joint Channel Estimation

It was agreed in 3GPP to specify a 'time domain window' for joint channel estimation. The window is used to determine the times over which a User Equipment (UE) is required to maintain power consistency and phase continuity among multiple transmissions of a physical channel. The window is characterized by a maximum duration, and it is still being discussed at the time of this writing if the maximum duration is reported by the UE as a UE capability. As will be discussed further below, the UEs may not be required to maintain phase continuity and power consistency of transmissions across slots if the transmissions occupy different PRBs, as can be the case for frequency hopped channels. Therefore, the relationship of frequency hopping when the network employs joint channel estimation and the UE is configured for inter-slot bundling of Demodulation Reference Signal (DMRS), is currently being discussed. The followings show some agreements related to the joint channel estimation:

* START AGREEMENTS *

Agreements:
For joint channel estimation, specify a time domain window during which a UE is expected to maintain power consistency and phase continuity among PUSCH transmissions subject to power consistency and phase continuity requirements.
FFS how the time domain window is determined (e.g., via explicit configuration and/or implicitly derived) and whether or not to have the possibility of enabling/disabling the time domain window
FFS the units the time domain windown (e.g., repetitions, slots, and/or symbols)
FFS : association between the potential use case(s) and units of the time window
FFS: single or multiple time domain windows
FFS: relation with UE capability
FFS: whether the term "time domain window" is used in the specification or replaced by other technical terms
FFS whether or not to further consider impacting of timing advance
Agreement:
Definition of the maximum duration: a maximum time duration during which UE is able to maintain power consistency and phase continuity subject to power consistency and phase continuity requirements.
FFS whether or not such a definition is necessary for RAN1 specifications.
Note: whether such a definition is to be specified in RAN4 specifications is up to RAN4.
FFS the maximum duration may be reported by UE.
Note: it is understood that for a UE, the maximum duration is no less than the time domain window duration
Agreements:
For inter-slot frequency hopping with inter-slot bundling, down select on the following two options:
Option 1: The bundle size (time domain hopping interval) equals to the time domain window size.
Option 2: The bundle size (time domain hopping interval) can be different from the time domain window size.
FFS: Whether the bundle size (time domain hopping interval) is explicitly configured or implicitly determined.
FFS: Whether/How the bundle size (time domain hopping interval) is defined separately for FDD and TDD.
FFS: relation between the bundle size (time domain hopping interval) and the time domain window size
Agreement:
Joint channel estimation for PUSCH transmissions is enabled or disabled via RRC configuration for a UE -continued

| |
|---|
| FFS: whether additional dynamic signaling is needed to enable/disable joint channel estimation for PUSCH transmissions |
| Note: the enabling of such a feature is subject to certain prerequisites |
| FFS RRC parameter details (including explicit vs. implicit configuration) |
| FFS For joint channel estimation for PUSCH, the time domain window is not explicitly enabled or disabled separately from joint channel estimation. |
| *** END AGREEMENTS *** |

Note:
Enabling/disabling of joint channel estimation for PUSCH transmissions means enabling/disabling of DMRS bundling for PUSCH transmissions under the condition of power consistency and phase continuity.

V. PUSCH Repetition and Transport Block Over Multiple Slot (TBoMS)

V.A. PUSCH Repetition in NR Rel-15

Slot aggregation for PUSCH is supported in Rel-15 and was renamed to PUSCH Repetition Type A in Rel-16. The name PUSCH repetition Type A is used even if there is only a single repetition, i.e. no slot aggregation. In Rel-15, a PUSCH transmission that would overlap with DL symbols is not transmitted.

For example, the document for Rel-15 (Final Report of 3GPP TSG RAN WG1 #AH_1801 V1.0.0, 3GPP TSG RAN WG1 Meeting #92, Athens, Greece, 26 Feb.-2 Mar. 2018) discloses:

- For DCI granted multi-slot transmission (PDSCH/PUSCH) vs semi-static DL/UL assignment
  - If semi-static DL/UL assignment configuration of a slot has no direction confliction with scheduled PDSCH/PUSCH assigned symbols, the PDSCH/PUSCH in that slot is received/transmitted
  - If semi-static DL/UL assignment configuration of a slot has direction confliction with scheduled PDSCH/PUSCH assigned symbols, the PDSCH/PUSCH transmission in that slot is not received/transmitted, i.e. the effective number of repetitions reduces.

That is, in Rel-15, the number of repetitions is semi-statically configured by RRC parameter pusch-AggregationFactor. At most 8 repetitions are supported as shown below:

| | |
|---|---|
| pusch-AggregationFactor | ENUMERATED { n2, n4, n8 } |

V.B. PUSCH Repetition in NR Rel-16

A new repetition format PUSCH repetition Type B is supported in Rel-16, which allows back-to-back repetition of PUSCH transmissions. The biggest difference of Type B from Type A is that repetition Type A only allows a single repetition in each slot, with each repetition occupying the same symbols. Using this format with a PUSCH length shorter than 14 introduces gaps between repetitions, increasing the overall latency. The other change compared to Rel-15 is how the number of repetitions is signaled. In Rel. 15, the number of repetitions is semi-statically configured, while in Rel. 16, the number of repetitions can be indicated dynamically in the DCI. This applies both to dynamic grants and configured grants type 2.

V.C. PUSCH Repetition Based on Available Slot in Rel-17

Two options for enhancement of PUSCH repetition Type A were agreed for the Rel-17 NR coverage enhancement work item in 3GPP. The first option increases the maximum number of repetitions up to a number to be determined during the course of the work. The second option counts the number of repetitions on the basis of available uplink slots, or equivalently, available PUSCH slots. While methods of identifying available slots for PUSCH repetition type A are still being discussed in 3GPP, it has been agreed that a slot is determined as unavailable if at least one of the symbols indicated by TDRA for a PUSCH in the slot overlaps with the symbol not intended for UL transmissions.

V.D. Transmission of TBoMS

In NR Rel-15/16, one UL TB is confined to the UL symbols in a slot. To support high data rate, multiple PRBs in a slot can be used for the transmission of a large TB and the multiple PRBs share UE transmission power. Transport block (TB) processing over multiple slots (TBoMS) was proposed as a candidate solution of coverage enhancement of PUSCH and is being specified in NR Rel-17. TBoMS extends the time domain resource for the transmission of a TB across slot border to increase total power for transmission of a TB compared to TB transmission in a single slot. TBoMS also reduces CRC overhead by reducing the number of CRCs in a given number of slots compared to the PUSCH transmissions at the same data rate with separate TBs. TBoMS is designed in part on PUSCH repetition type A, in that the same number of OFDM symbols are occupied per slot and that the slots in which the UE transmits a TBoMS are identified as available slots.

SUMMARY

Systems and methods are disclosed herein for improving frequency hopping schemes that are compatible with joint channel estimation. In one embodiment, a method implemented in a User Equipment (UE) of transmitting a physical channel in different frequency domain resources over time comprises determining a value of a hopping index for a first set of N consecutive slots, wherein the N is an integer greater than 1. The method further comprises, after the N consecutive slots, incrementing the value of the hopping index for a second set of N consecutive slots comprising both a downlink slot and an uplink slot. The method further comprises resetting the value of the hopping index to zero if the hopping index exceeds a maximum value. The method further comprises, for an uplink slot within the second set of N consecutive slots in which a physical uplink channel is to be transmitted, determining a set of physical resource blocks (PRBs) in which to transmit the physical channel from a set of frequency offsets according to the value of the hopping index for the second set of N consecutive slots and transmitting the physical uplink channel in the selected set of PRBs in the uplink slot.

In one embodiment, the first set of N consecutive slots comprise both a downlink slot and an uplink slot.

In one embodiment, the value of the hopping index is a function of physical slot number. In another embodiment, the value of the hopping index is defined as:

$$n_{hop} = \lfloor n^{\mu}_{s,f}/N \rfloor \bmod L$$

where $n_{hop}$ is the hopping index, $$n^{\mu}_{s,f}$$

is a physical slot number of a slot to which the hopping index applies, N is the number of consecutive slots to which the hopping index applies, and L−1 is a maximum value of the hopping index where the hopping index is a value in a range of and including 0 to L−1. In one embodiment, the value of the hopping index is further a function of a defined or configured offset.

In one embodiment, the value of the hopping index is defined as:

$$n_{hop} = \left\lfloor (n^{\mu}_{s,f} + n_{off})/N \right\rfloor \bmod L$$

where $n_{hop}$ is the hopping index, $$n^{\mu}_{s,f}$$

is a physical slot number of a slot to which the hopping index applies, $n_{off}$ is a defined or configured offset, N is the number of consecutive slots to which the hopping index applies, and L−1 is a maximum value of the hopping index where the hopping index is a value in a range of and including 0 to L−1.

In one embodiment, the hopping index changes once every N consecutive time slots, the N consecutive time slots comprise both a downlink slot and an uplink slot, and the offset attains one of L values corresponding to L possible offsets.

In one embodiment, the offset is configured each slot of a set of N slots, where N is an integer divisor of a predetermined number of slots. In one embodiment, the predetermined number of slots is a number of slots in a radio frame or a number of slots in a predetermined number of radio frames.

In one embodiment, the offset is a function of the value of the hopping index.

In one embodiment, the offset is a predetermined number of PRBs times of the value of the hopping index.

In one embodiment, N has a value that is a submultiple of a number of slots in a configured Time Division Duplexing (TDD) Uplink-Downlink pattern.

In one embodiment, the UE indicates the capability of the UE for a frequency hopping pattern configured for each slot of multiple slots that have been indicated to the UE independent of whether the UE indicates a capability of the UE to maintain phase continuity among uplink transmissions in different slots.

Corresponding embodiments of a UE are also disclosed. In one embodiment, a UE for transmitting a physical channel in different frequency domain resources over time is adapted to determine a value of a hopping index for a first set of N consecutive slots, wherein the N is an integer greater than 1. The UE is further adapted to, after the N consecutive slots, increment the value of the hopping index for a second set of N consecutive slots comprising both a downlink slot and an uplink slot. The UE is further adapted to reset the value of the hopping index to zero if the hopping index exceeds a maximum value. The UE is further adapted to, for an uplink slot within the second set of N consecutive slots in which a physical uplink channel is to be transmitted, determine a set of PRBs in which to transmit the physical channel from a set of frequency offsets according to the value of the hopping index for the second set of N consecutive slots and transmit the physical uplink channel in the selected set of PRBs in the uplink slot.

In one embodiment, a UE for transmitting a physical channel in different frequency domain resources over time comprises one or more transmitters, one or more receivers, and processing circuitry associated to the one or more transmitters and the one or more receivers. The processing circuitry is configured to cause the UE to determine a value of a hopping index for a first set of N consecutive slots, wherein the N is an integer greater than 1. The processing circuitry is further configured to cause the UE to, after the N consecutive slots, increment the value of the hopping index for a second set of N consecutive slots comprising both a downlink slot and an uplink slot. The processing circuitry is further configured to cause the UE to reset the value of the hopping index to zero if the hopping index exceeds a maximum value. The processing circuitry is further configured to cause the UE to, for an uplink slot within the second set of N consecutive slots in which a physical uplink channel is to be transmitted, determine a set of PRBs in which to transmit the physical channel from a set of frequency offsets according to the value of the hopping index for the second set of N consecutive slots and transmit the physical uplink channel in the selected set of PRBs in the uplink slot.

In another embodiment, a method in a UE for transmitting a physical channel in different frequency domain resources over time comprises receiving signaling that configures the UE with a plurality of time domain windows to be used for DeModulation Reference Signal (DMRS) bundling and restarting the frequency hopping pattern at a start of each of the plurality of time domain windows to be used for DMRS bundling.

In one embodiment, restarting the frequency hopping pattern at a start of each of the plurality of time domain windows to be used for DMRS bundling comprises, in a first configured time domain window from among the plurality of time domain windows to be used for DMRS bundling, transmitting an uplink physical channel with frequency hopping offsets defined by the frequency hopping pattern and, in a second configured time domain window from among the plurality of time domain windows to be used for DMRS bundling, transmitting an uplink physical channel with frequency hopping offsets defined by the frequency hopping pattern where the frequency hopping pattern is restarted at a start of the second configured time domain window.

In another embodiment, a method in a UE for identifying capability for DMRS bundling comprises reporting UE capability for DMRS bundling according to a combination of parameters, the combination of parameters comprising two or more of a maximum amount of a maximum window length in units of time, a measure of phase error, or a maximum number of repetitions of a Physical Uplink Shared Channel (PUSCH).

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 3 illustrates an example of an enhanced hopping pattern derived from a slot number.

FIG. 4 illustrates an example of an enhanced hopping pattern derived from a slot number offset.

FIG. 6 illustrates a comparison between a configurable hopping pattern and its alternatives.

DETAILED DESCRIPTION

Figure 1:
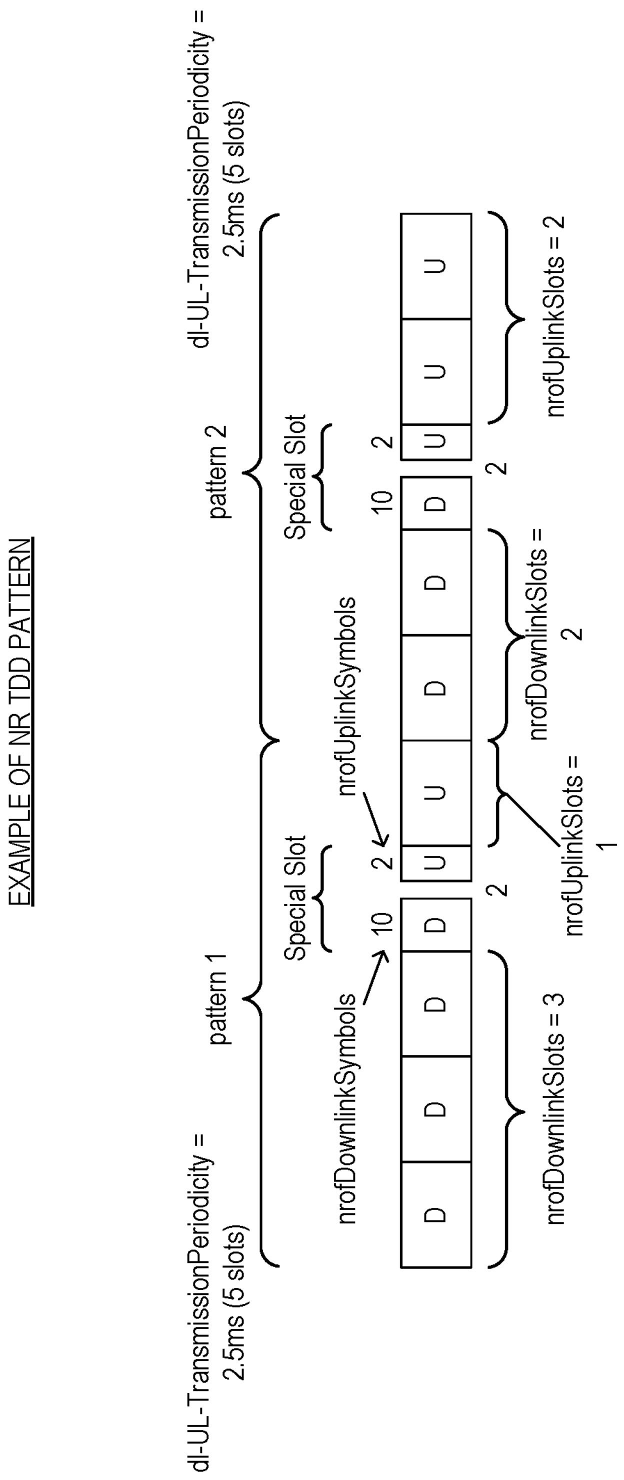
FIG. 1 illustrates an example of New Radio (NR) Time-Division Multiplexing (TDD) pattern.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Systems and methods are disclosed herein for improving frequency hopping schemes that are compatible with joint channel estimation in both Time-division multiplexing (TDD) and Frequency-division multiplexing (FDD) operation. In one embodiment, a method implemented in a User Equipment (UE) of transmitting a physical channel in different frequency domain resources over time comprises determining a value of a hopping index for N consecutive slots. The N is an integer greater than 1 and the N consecutive slots comprise both a downlink slot and an uplink slot. The method also comprises incrementing the hopping index after the N consecutive slots and resetting the hopping index to zero if the hopping index exceeds a maximum value. The method also comprises determining a set of PRBs in which to transmit the physical channel from a set of frequency offsets according to the hopping index, and transmitting the physical channel in the selected set of PRBs in a slot. In this manner, the PRBs may be used efficiently for frequency hopping operation and spatially efficient operations of a network node and the UE may be enabled while not increasing interference received by the network node.

In one embodiment, the method further comprises receiving an indication of a hopping index offset O and shifting the hopping index by O slots, such that a value of the hopping sequence in slot n occurs one of O slots earlier or later than for O=0.

In one embodiment, the method further comprises at least one of (a) resetting the hopping index to an initial value in response to receiving an indication to reset a frequency hopping pattern and (b) selecting one of a first frequency hopping pattern or a second frequency hopping pattern configured to the UE in response to receiving an indication to select the pattern.

In one embodiment, the method further comprises receiving signaling identifying a pattern of uplink and downlink slots, the pattern repeating every M slots and receiving signaling identifying N, where N is constrained such that M/N is an integer.

In one embodiment, the method further comprises receiving an allocation of PRBs and performing at least one of (a) receiving signaling identifying the set of frequency offsets, selecting an offset from the set according to the hopping index, and determining the set of PRBs by shifting the allocation of PRBs in the frequency domain by the offset, (b) calculating an offset of the set of frequency domain offsets by multiplying the hopping index by a predetermined number of PRBs, and (c) determining the set of PRBs by shifting the allocation of PRBs in the frequency domain by the calculated offset.

In one embodiment, a method implemented in the UE of transmitting a physical channel in different frequency domain resources over time, the method comprises receiving a list of frequency hopping offsets. Each offset in the list corresponds to a slot that has been indicated to the UE as one in which the UE may transmit the physical channel. The method further comprises selecting a frequency offset according to a number of repeated transmissions of the physical channel, wherein the first frequency offset is selected for a first transmission of the physical channel, a second offset is selected for a second transmission, and so on. For repeated transmissions starting with a transmission T, with T=P+1, wherein P is a number of frequency hopping offsets in the list, the method further comprises selecting the first frequency offset for transmission T, the second frequency offset for transmission T+1 and so on. For at least one of the repeated transmissions, the method further comprises determining a set of PRBs in which to transmit a physical channel from a set of frequency offsets according to the hopping. The method further comprises transmitting the at least one of the repeated transmissions of the physical channel in the set of PRBs.

In one embodiment, the method further comprises receiving an indication of a hopping index offset O and selecting a frequency hopping offset with index O in the list as the first frequency offset, a frequency hopping offset with index O+1 in the list as the second frequency offset, and so on. For repeated transmissions starting with a transmission T+O, with T+O=P+1, the method further comprises selecting the frequency hopping offset with index O in the list as the first frequency offset for transmission T, the frequency hopping offset with index O+1 in the list as the second frequency offset for transmission T+1 and so on.

In one embodiment, the method further comprises at least one of (a) selecting the first frequency offset as the first frequency offset for a transmission T', the second frequency offset as a second frequency offset for transmission T'+1, and so on, in response to receiving an indication to reset a frequency hopping pattern and (b) selecting one of a first frequency hopping pattern or a second frequency hopping pattern configured to the UE in response to receiving an indication to select the pattern.

In one embodiment, the method further comprises receiving signaling identifying a pattern of uplink and downlink slots, the pattern repeating every M slots and the list of frequency hopping offsets being constrained such that M/P is an integer.

In one embodiment, the method further comprises transmitting the physical channel according to a first element of the frequency hopping pattern in a first slot of each of the one or more time domain windows to be used for DeModulation Reference Signal (DMRS) bundling.

In one embodiment, the UE indicates capability to transmit independent of whether the UE indicates capability to maintain phase continuity among uplink transmissions in different slots.

In one embodiment, in the UE for identifying capability for DMRS bundling, the method further comprises reporting UE capability for DMRS bundling according to a combination of parameters, including two or more of a maximum amount of a maximum window length in units of time (such as slots, symbols, or seconds), a measure of phase error, or a maximum number of repetitions of a Physical uplink shared channel (PUSCH).

Corresponding embodiments of the UE are also disclosed. In one embodiment, the UE is adapted to (a) determine a value of a hopping index for N consecutive slots, wherein the N is an integer greater than 1 and the N consecutive slots comprise both a downlink slot and an uplink slot, (b) increment the hopping index after the N consecutive slots, (c) reset the hopping index to zero if the hopping index exceeds a maximum value, (d) determine a set of PRBs in which to transmit a physical channel from a set of frequency offsets according to the hopping index; and (e) transmit the physical channel in the selected set of PRBs in a slot.

In one embodiment, the UE comprises one or more transmitters, one or more receivers, and processing circuitry associated with the one or more transmitters and the one or more receivers. The processing circuitry is configured to cause the UE to (a) determine a value of a hopping index for N consecutive slots, wherein the N is an integer greater than 1 and the N consecutive slots comprise both a downlink slot and an uplink slot, (b) increment the hopping index after the N consecutive slots, (c) reset the hopping index to zero if the hopping index exceeds a maximum value, (d) determine a set of PRBs in which to transmit a physical channel from a set of frequency offsets according to the hopping index; and (e) transmit the physical channel in the selected set of PRBs in a slot.

In one embodiment, the UE is adapted to (a) receive a list of frequency hopping offsets, wherein each offset in the list corresponds to a slot that has been indicated to the UE as one in which the UE may transmit the physical channel; (b) select a frequency offset according to a number of repeated transmissions of the physical channel, wherein the first frequency offset is selected for a first transmission of the physical channel, a second offset is selected for a second transmission, and so on; (c) for repeated transmissions starting with a transmission T, with T=P+1, wherein P is a number of frequency hopping offsets in the list, select the first frequency offset for transmission T, the second frequency offset for transmission T+1 and so on; (d) for at least one of the repeated transmissions, determine a set of PRBs in which to transmit a physical channel from a set of frequency offsets according to the hopping index; and (e) transmit the at least one of the repeated transmissions of the physical channel in the set of PRBs.

In one embodiment, the UE comprises one or more transmitters, one or more receivers, and processing circuitry associated with the one or more transmitters and the one or more receivers. The processing circuitry is configured to cause the UE to (a) receive a list of frequency hopping offsets, wherein each offset in the list corresponds to a slot that has been indicated to the UE as one in which the UE may transmit the physical channel;

(b) select a frequency offset according to a number of repeated transmissions of the physical channel, wherein the first frequency offset is selected for a first transmission of the physical channel, a second offset is selected for a second transmission, and so on;

(c) for repeated transmissions starting with a transmission T, with T=P+1, wherein P is a number of frequency hopping offsets in the list, select the first frequency offset for transmission T, the second frequency offset for transmission T+1 and so on; (d) for at least one of the repeated transmissions, determine a set of PRBs in which to transmit a physical channel from a set of frequency offsets according to the hopping index; and (e) transmit the at least one of the repeated transmissions of the physical channel in the set of PRBs.

Figure 2A:
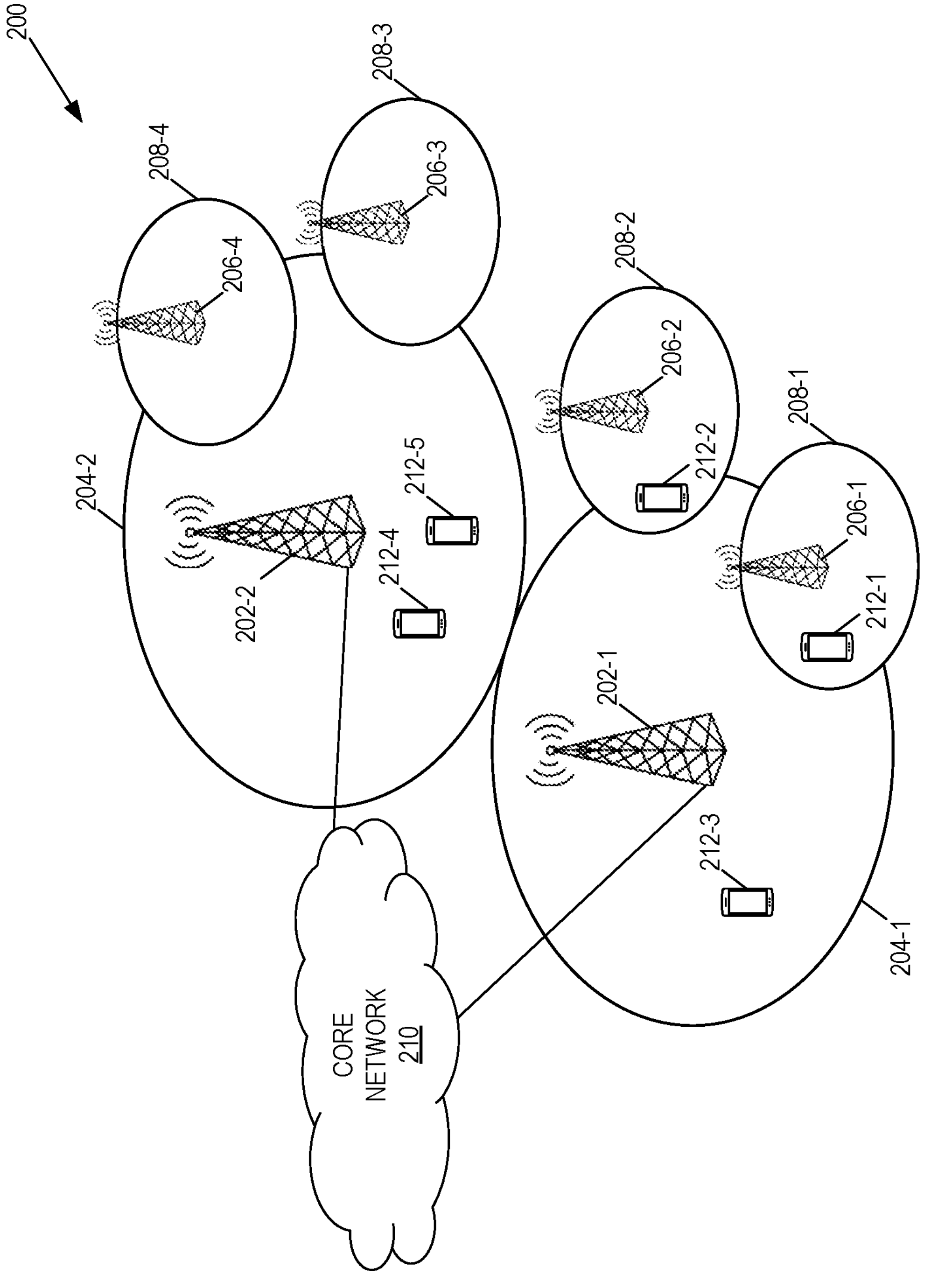
FIG. 2A illustrates one example of a cellular communications system according to some embodiments of the present disclosure.

FIG. 2A illustrates one example of a cellular communications system 200 in which embodiments of the present disclosure may be implemented. In the embodiments described herein, the cellular communications system 200 is a 5G system (5GS) including a Next Generation RAN (NG-RAN) and a 5G Core (5GC). In this example, the RAN includes base stations 202-1 and 202-2, which in the 5GS include NR base stations (gNBs) and optionally next generation eNBs (ng-eNBs) (e.g., LTE RAN nodes connected to the 5GC), controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or RRHs, or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5G System (5GS) is referred to as the 5GC. The base stations 202 (and optionally the low power nodes 206) are connected to the core network 210.

The base stations 202 and the low power nodes 206 provide service to wireless communication devices 212-1 through 212-5 in the corresponding cells 204 and 208. The wireless communication devices 212-1 through 212-5 are generally referred to herein collectively as wireless communication devices 212 and individually as wireless communication device 212. In the following description, the wireless communication devices 212 are oftentimes UEs, but the present disclosure is not limited thereto.

Before describing embodiments of the present disclosure, a brief discussion of problems with the existing frequency hopping solution is beneficial. Frequency hopping patterns currently defined by 3GPP NR Rel-15 and Rel-16 are not compatible with maintaining the phase continuity and power consistency needed for joint channel estimation. Current frequency hopping patterns, change the Resource Blocks (RBs) occupied by a Physical Uplink Shared Channel (PUSCH) according to the slot number. This is expected to preclude phase continuity and power consistency between adjacent slots, and so enhancements to frequency hopping that are compatible with maintaining phase continuity and power consistency are to be specified in the Rel-17 NR coverage enhancement work item.

Simple approaches such as increasing the number of adjacent PUSCH transmissions that occupy a given set of Physical Resource Blocks (PRBs) have been proposed, for example in 3GPP document R1-2107604. However, such approaches do not address issues such as when the number of adjacent PUSCH slots varies in Time Division Duplexing (TDD) patterns, how to allow more flexible frequency hopping patterns that provide better diversity and better joint channel estimation performance, nor general frequency hopping patterns that can be used both with and without joint channel estimation. Since frequency hopping operation is generally configured for many UEs in a cell, it is important to control signaling overhead, especially Downlink Control Information (DCI) signaling, that allows them to share spectrum efficiently, and these aspects have not been considered in depth as of yet in 3GPP discussions. Efficient ways of signaling frequency hopping patterns in Radio Resource Control (RRC) that are compatible with joint channel estimation are also not yet well addressed in 3GPP discussions, since the fundamental aspects of joint channel estimation are still being defined.

Implementation of joint channel estimation in UEs is still being studied in 3GPP, and combinations of parameters that define UE capability for joint channel estimation are not yet understood. Embodiments herein allow for where implementation may be more or less difficult according to the maximum amount of phase error the UE is required to have across slots and how maximum phase error requirements can be combined with other parameters such as with the maximum time period over which the UE maintains phase continuity and power consistency.

Systems and methods are disclosed herein that address the aforementioned and/or other challenges. The present disclosure describes methods for configuring frequency hopping so that the frequency hopping may work efficiently considering aspects such as TDD patterns and UE capability for Demodulation Reference Signal (DMRS) bundling (maintaining coherence across multiple slots for joint channel estimation).

Some embodiments of the present disclosure include (a) creating, signaling, and applying suitable frequency hopping patterns that (i) assign the same hop frequency index across multiple consecutive slots and (ii) change the hopping frequency based on radio frame timings, (b) handling of UEs that do not support DMRS bundling, and (c) defining UE capability according to a different amounts of phase error tolerances that vary according to the duration of a time domain window used for DMRS bundling and/or a maximum number of repetitions of a PUSCH.

The present disclosure provides enhanced frequency hopping patterns that are compatible with joint channel estimation in both TDD and Frequency Division Duplexing (FDD) operation, may be signaled with low DCI and low RRC overhead, may be used when not all UEs in a cell are configured with joint channel estimation, and may improve performance even when joint channel estimation is not configured.

The present disclosure allows capability for joint channel estimation to be defined according to different amounts of maximum phase error allowed in operation, which may better match UE implementation, enabling better cost/performance tradeoffs in UE designs as well as better defined UE behavior limitations.

Time Domain Windows for Joint Channel Estimation

In 3GPP RAN1 #106-e meeting, the following working assumption has been made in a document (RAN1 Chair's Notes, 3GPP TSG RAN WG1 #106-e, Aug. 16-27, 2021) with respect to the time window definition for supporting joint channel estimation.

* START EXCERPT FROM RAN1 CHAIR'S NOTES *

Working assumption:

For joint channel estimation for PUSCH repetition type A of PUSCH repetitions of the same TB, all the repetitions are covered by one or multiple consecutive/non-consecutive configured TDWs.

Each configured TDW consists of one or multiple consecutive physical slots.

The window length L of the configured TDW(s) can be explicitly configured with a single value ~~and $L$ is no longer than the maximum duration~~.

FFS: The maximum value of L ~~is the duration of all repetitions~~

FFS: Solutions to error propagation issue if ~~for~~ L is longer than the maximum duration is to be discussed further.

FFS: The window length L is configured per UL BWP

The start of the first configured TDW is the first PUSCH transmission

FFS: The first available slot/symbol, or the first physical slot/symbol for the first PUSCH transmission.

The start of other configured TDWs can be implicitly determined prior to first repetition.

FFS: The configured TDWs are consecutive for paired spectrum/SUL band

FFS: The start of the configured TDWs for unpaired spectrum is implicitly determined based on semi-static DL/UL configuration.

The end of the last configured TDW is the end of the last PUSCH transmission.

FFS: The end of the configured TDW is the last available slot/symbol, or the last physical slot/symbol for the last PUSCH transmission.

Within one configured TDW, one or multiple actual TDWs can be implicitly determined:

The start of the first actual TDW is the first PUSCH transmission within the configured TDW.

FFS: The first available slot/symbol, or the first physical slot/symbol for the first PUSCH transmission.

After one actual TDW starts, UE is expected to maintain the power consistency and phase continuity until one of the following conditions is met, then the actual TDW is ended.

The actual TDW reaches the end of the last PUSCH transmission within the configured TDW.

FFS: The end of the actual TDW is the last available slot/symbol, or the last physical slot/symbol for the last PUSCH transmission.

An event occurs that violates power consistency and phase continuity

FFS: The events may include e.g., a DL slot based on DL/UL configuration for unpaired spectrum, the actual TDW reaches the maximum duration, DL reception/monitoring occasion for unpaired spectrum, high priority transmission, frequency hopping, precoder cycling.

FFS: The end of the actual TDW is the last available slot/symbol of the PUSCH transmission right before an event such that the power consistency and phase continuity are violated.

If the power consistency and phase continuity are violated due to an event, whether a new actual TDW is created is subject to UE capability of supporting restarting DMRS bundling.

If UE is capable of restarting DM-RS bundling, one new actual TDW is created after the event, FFS: The start of the new actual TDW is the first available slot/symbol for PUSCH transmission after the event.

If UE is not capable of restarting DM-RS bundling, no new actual TDW is created until the end of the configured TDW.

FFS: UE capability of restarting DMRS bundling is applied only to dynamic event or not

* END EXCERPT FROM RAN1 CHAIR'S NOTES *

Note 1:

A 'configured TDW' refers to a time domain window whose length can be configured to 'L' and whose start and end is determined as described above.

Note 2:

An 'actual TDW' refers to a time domain window during whose entire duration the DM-RS bundling is actually applied. An 'actual TDW' duration is always less than or equal to the 'configure TDW' duration.

Note 3:

Whether the terms 'configured TDW' and 'actual TDW' are revised to other terms and if such terminology is used in specifications is to be further discussed.

In the present disclosure, the terms "PUSCH transmission," "PUCCH transmissions," or "PUSCH or PUCCH transmission" used are just examples of the uplink (UL) transmissions to be received in the window with joint channel estimation. The present disclosure does not preclude any other types of UL transmissions in a joint channel estimation time window that could be received with a jointly estimated channel. Much of the present disclosure could apply also to downlink (DL) (e.g., Physical Downlink Shard Channel (PDSCH), with gNB as the transmitter and the UE receiver), or side-link (UE to UE), but those cases are not currently being standardized in 3GPP.

The UE will be configured to support joint channel estimation in Rel-17, where the gNB (or a receiving network node) performs the joint channel estimation. The support of the joint channel estimation comprises maintaining phase continuity and/or power consistency among multiple transmissions of physical channels from the UE, in particular, maintaining this consistency among DMRS transmissions of the physical channels. Therefore, in the present disclosure, configuring the UE to support joint channel estimation is referred to as configuring the UE to use "DMRS bundling." Such configuration can be done independently for a given physical channel from other physical channels; for example, the UE could be configured for DMRS bundling for only one of PUCCH or PUSCH. Similarly, UE capability to support joint channel estimation in the network can be referred to as the capability to support DMRS bundling.

As can be seen in the working assumption above, time domain windows start with a first transmission, and the duration of the windows covers all repetitions of the physical channel. If we generalize the working assumption to cover both PUCCH and PUSCH, the start of the first window is where a first PUSCH or PUCCH transmission occurs, and the end of the last window is the end of the last PUSCH or PUCCH transmission. Each window comprises one or more consecutive slots, and can be configured with a length L. UEs maintain phase continuity and power consistency until the end of the window or until a constraint is not met, which is discussed in more detail below. For the sake of brevity, rather than identifying the transmissions as PUCCH or PUSCH, hereinafter "transmissions" may refer to "PUCCH transmissions" or "PUSCH transmissions," unless otherwise noted.

While the window defines a specific region where phase continuity or power consistency can be maintained (within a certain error tolerance), other constraints also apply. A UE is not required to maintain phase continuity if a variety of conditions occur, such as for one UE implementation if the transmit power, modulation state, or subcarriers (occupied by the transmission) change. The UE must also use a same beam, precoder, or both of the same beam and the same precoder, across the PUSCH transmissions when the beams or the precoders are used. Furthermore, the UE is not required to maintain the phase continuity and the power consistency within a certain range if it turns off its transmit chain, for example, when it receives the downlink. The ability to maintain the phase continuity and the power consistency on one carrier can also be limited when the UE is scheduled on a different carrier. Furthermore, the UE should not adjust a timing advance (TA) during a time domain window. For the sake of brevity, in further discussion herein, the phase continuity and the power consistency constraints will be referred to as "continuity constraints," and the phase continuity and the power consistency within a certain range will generally be referred to as "continuity."

Larger amounts of phase continuity errors accumulated over repetitions of a PUSCH may be tolerated if fewer repetitions of the PUSCH are transmitted. Measurements of the phase continuity errors may include a Root-Mean-Square (RMS) phase error, or an Error Vector Magnitude (EVM), over a measurement interval (such as one or more slots). In such cases, time domain window length may relate to the UE capability on the phase continuity and the power consistency within a certain range. Such capability may also be associated with certain constraints, e.g. a condition that only a certain number of repetitions is allowed or another condition that there is no frequency/time adjustment during a certain number of time slots. The UE may report these capabilities in association with different phase continuity ranges. The network may schedule the corresponding number of repetition within such window according to the constraints identified by the UE capability reporting.

Figure 2B:
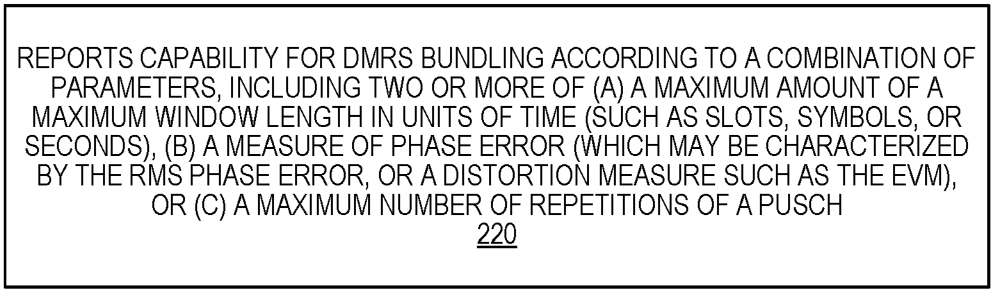
FIG. 2B is a flow chart that illustrates the operation of a User Equipment (UE) in accordance with some embodiments of the present disclosure.

Therefore, in some embodiments, UE capability for DMRS bundling is defined according to a combination of parameters, including two or more of (a) a maximum amount of a maximum window length in units of time (such as slots, symbols, or seconds), (b) a measure of phase error (which may be characterized by the RMS phase error, or a distortion measure such as the EVM), or (c) a maximum number of repetitions of a PUSCH. In this regard, FIG. 2B is a flow chart that illustrates the operation of a UE in accordance with some embodiments of the present disclosure. As illustrated, the UE reports its capability for DMRS bundling according to a combination of parameters, including two or more of (a) a maximum amount of a maximum window length in units of time (such as slots, symbols, or seconds), (b) a measure of phase error (which may be characterized by the RMS phase error, or a distortion measure such as the EVM), or (c) a maximum number of repetitions of a PUSCH (step 220).

Frequency Hopping Compatible with Joint Channel Estimation

The following was agreed in a document of 3GPP TSG RAN meeting (R1-2104151, "Final Report of 3GPP TSG RAN WG1 #104bis-e" V1.0.0, 3GPP TSG RAN WG1 Meeting #105-e, e-Meeting, May 10-27, 2021):

* START EXCERPT FROM R1-2104151 *

Agreements:

For inter-slot frequency hopping with inter-slot bundling, down select on the following two options:

Option 1: The bundle size (time domain hopping interval) equals to the time domain window size.

Option 2: The bundle size (time domain hopping interval) can be different from the time domain window size.

FFS: Whether the bundle size (time domain hopping interval) is explicitly configured or implicitly determined.

FFS: Whether/How the bundle size (time domain hopping interval) is defined separately for FDD and TDD.

FFS: relation between the bundle size (time domain hopping interval) and the time domain window size

* END EXCERPT FROM R1-2104151 *

Also, the document, R4-2103393, of 3GPP RAN4 states the followings, in part:

* START EXCERPT FROM R4-2103393 *

Ran4 has discussed the phase continuity and concluded that the cases where continuity is lost in repetitions.

Questions from RAN1 with answers from RAN4

Question 1: Under what conditions UE can keep phase continuity cross PUCCH or PUSCH repetitions RAN4 Answer for question 1: If the following conditions are met Modulation order does not change.

RB allocation in terms of length and frequency position should not be changed, and intra-slot and inter-slot frequency hopping is not enabled within a repetition bundle.

No change on transmission power level of its own CC, i.e., no change on the power control parameters specified in TS 38.213, and also when own CC is not impacted by other concurrent CC(s) that are configured for inter-band CA or DC for same UE with dynamic power sharing and no change in any configured CC s that are part of configured intra-band uplink CA or DC. ~~No change on transmission power level of its own CC, i.e., no change on the power control parameters specified in TS 38.213, and also not impacted by other concurrent CC(s) for CA and DC with dynamic power sharing~~

No UL beam switching for FR2 UE occurs

* END EXCERPT FROM R4-2103393 *

That is, according to the above statement, a requirement to maintain phase continuity is that "RB allocation in terms of length and frequency position should not be changed, and intra-slot and inter-slot frequency hopping is not enabled within a repetition bundle." This requirement should be compatible with other requirements for continuity, such as in TDD that the UE does not receive a downlink slot.

The Rel-15 hopping patterns change the occupied RBs according to the slot number, as described above. This would preclude continuity between adjacent slots, and so enhancements to frequency hopping are to be specified in the Rel-17 NR coverage enhancement work item.

When considering hopping patterns that are compatible with continuity requirements in joint channel estimation, it is desirable that all of the UEs in the cell may follow a same hopping pattern. This allows frequency domain resources to be used efficiently, such that when a first UE hops to a given set of PRBs, a second UE hops to the PRBs occupied by the first UE after the first UE hops to a next set of PRBs. Such behavior is possible when the hopping pattern has common timing for all of the UEs in the cell, where, for example, a counter in the hopping pattern is based on a common-timing reference such as the radio frame timing. If the hop counter is not based on frame timing, then it must be determined based on something else. One possibility would indicate the hop timing or hop counter in DCI, but this increases DCI overhead, and, in general, may not be beneficial since all of the UEs in the cell should use the same timing in the hopping pattern.

One method to increase the number of adjacent slots occupy the same PRBs is to use a hopping counter that changes once every N slots, regardless of the uplink slots or the downlink slots. If the number of consecutive uplink slots is less than N and if N divides the TDD pattern evenly, then the consecutive UL slots will occupy the same PRBs. This can be illustrated in FIG. 4.

In FIG. 3, the uplink, downlink, and special slots in the TDD pattern are identified in the "Direction" row with U, D, and S, respectively. Uplink slots are highlighted, since these are where the PUSCH repetitions are transmitted. Regarding "the slot number," the present disclosure considers a common TDD pattern that has one isolated UL slot every other 5 slots and two adjacent uplink slots every other 5 slots. Setting N=5 means that the "hopping counter" changes once every 5 slots, and since 5 evenly divides the 10 ms TDD pattern periodicity, the hopping counter is constant over the consecutive uplink slots.

The hopping counter takes on one of L values in the range {0 . . . L−1}, allowing L distinct positions in frequency. This allows better performance than Rel-15 in cases where there is insufficient diversity. The overall hopping counter calculation can then be expressed as:

$$n_{hop} = \lfloor n^{\mu}_{s,f}/N \rfloor \bmod L$$

where $$n^{\mu}_{s,f}$$

is the slot number and $n_{hop}$ is the hopping counter in FIG. 3.

In one embodiment, an offset is added to above formula. In this way, a proper offset value would make sure the hopping pattern change starts from an expected slot. In one approach to this embodiment, the slot level offset is added to determine the hop ID:

$$n_{hop} = \lfloor (n^{\mu}_{s,f} + n_{off})/N \rfloor \bmod L$$

As an example, when N=5, L=3, and $n_{off}$=3 is given in FIG. 4.

In another embodiment, a slot level offset, $L_{off}$ is added to determine the hop ID, where $0 \le L_{off} < L$, as shown in the equation below. This offset allows different UEs with different values of $L_{off}$ to share a same set of PRBs $$n_{hop} = \lfloor (n^{\mu}_{s,f}/N \rfloor + L_{off}) \bmod L$$

In order to obtain the best joint channel estimation gain, each frequency hopping position (which is indexed by the frequency hopping counter in the above embodiments) may be used in adjacent uplink slots during the slots containing a repetition of a transport block. For TDD patterns described above, where an isolated UL slot alternates with two adjacent UL slots, this may be facilitated by the choosing an odd value of L. In the embodiments above, L=3. If a PUSCH is repeated 8 times starting with slot $$n^{\mu}_{s,f} = 8,$$

the hopping sequence is $n_{hop}$={11, 2, 00, 1, 22}, and so all 3 hopping positions occupy adjacent UL slots once. This is not the case for all starting slot numbers; for example, if the starting slot is $$n^{\mu}_{s,f} = 4,$$

the sequence is $n_{hop}$={0, 11, 2, 00, 1, 2}, and so the frequency hopping position $n_{hop}$=2 does not occupy adjacent slots. Therefore, if the network wishes to have the best performance, it may need to select particular starting slots in the frequency hopping pattern, or use more repetitions to allow more chance for adjacent UL slots on the same frequency offset.

The frequency hopping offset could be calculated simply by $\lfloor N_{prb}/L \rfloor \cdot n_{hop}$, where $N_{prb}$ is the number of PRBs in the UL bandwidth part used by the UE to transmit the PUSCH. However, this would make it difficult to schedule the UEs that do not perform the frequency hopping with other UEs that do performing frequency hopping. One way to avoid this difficulty is to configure the UE with a frequency hopping offset value for each of the L possible hops. The frequency hopping offset value may be an offset similar to $RB_{offset}$ used in Rel-16 frequency hopping. It is also possible to determine a frequency hopping pattern without directly using a slot number.

In one embodiment, the hopping counter is not based directly on the system frame timing as in $$n_{hop} = \lfloor n^{\mu}_{s,f}/N \rfloor \bmod L$$

and its variants, but rather there is an additional counter m that is increased every slot, and once it reaches a limit value $m_{lim}$, then $n_{hop}$ is updated, e.g. increased by 1 modulus L according to $$n_{hop} \leftarrow (n_{hop} + 1) \bmod L$$

and m is reset to zero. The value of m would thus be updated according to $$m \leftarrow (m + 1) \bmod m_{lim}$$

once every slot. The counter m must initially be initialized to some value (e.g., 0, or some signaled value), at some well-defined point in time (e.g., the start of a radio frame). In another embodiment, the counter be initialized differently for different UEs. In another embodiment, the reset of the counter m is tied to the configured TDD UL/DL pattern.

In one embodiment, the number of consecutive slots with a certain $n_{hop}$ is not a constant, but may vary. For example, there may be a set of 3 consecutive slots with one value of $n_{hop}$ followed by a set of 2 consecutive slots with another value of $n_{hop}$, and then again 3 consecutive slots, and 2 consecutive slots, and so on. This can be useful to hop between every UL slot in a UL/DL pattern such as DUDDU, or DDDDUDDDU. While such patterns may be unlikely in a network with semi-statically configured UL/DL pattern, it might temporarily occur in a network with more dynamically configured TDD pattern. In order to realize a hopping pattern with varying number of consecutive slots for each $n_{hop}$, one option is to have two $m_{lim}$ values that are alternatively used to update m. Another option is to determine $n_{hop}$ based on a mapping function from the modulus of the slot number, e.g.

$$n_{hop} = f\left(n_{s,f}^{\mu} \bmod L\right)$$

For example, for the TDD pattern DUDDU, a suitable function $f$ could be defined as $$f(n) = \begin{cases} 0 & \text{if } 0 \le n < 2 \\ 1 & \text{if } 3 \le n < 5 \end{cases}$$

(Such a function could be used also if the number of consecutive slots on each frequency is always the same.) Yet another option is to tie the resetting of m (or the definition of the function $f$) to the concatenation boundary of a (semi-statically configured) concatenated TDD pattern ("pattern1" and "pattern2" in clause 11.1 of 3GPP TS 38.213 V16.5.0).

In one embodiment, the network can signal to the UE, e.g. via the DCI, that the counter m should be reset to 0, or set to some specific value. This may be useful in networks do not use semi-statically configured UL/DL patterns.

Therefore, in some embodiments, the UE transmits according to a frequency hopping pattern, wherein the frequency hopping offset (i.e., the frequency hopping index) changes once every N consecutive time instants and the N consecutive time instants comprise both a downlink slot and an uplink slot, and the frequency hopping offset attains one of L values. In some embodiments, the value of L can be an odd number. In some embodiments, the value of Nis always a submultiple of the number of slots in a configured TDD UL-DL pattern, such as that defined by "pattern1," possibly summed with that of "pattern2," in TDD-UL-DL-ConfigCommon in 3GPP TS 38.331 V16.5.0.

Figure 5A:
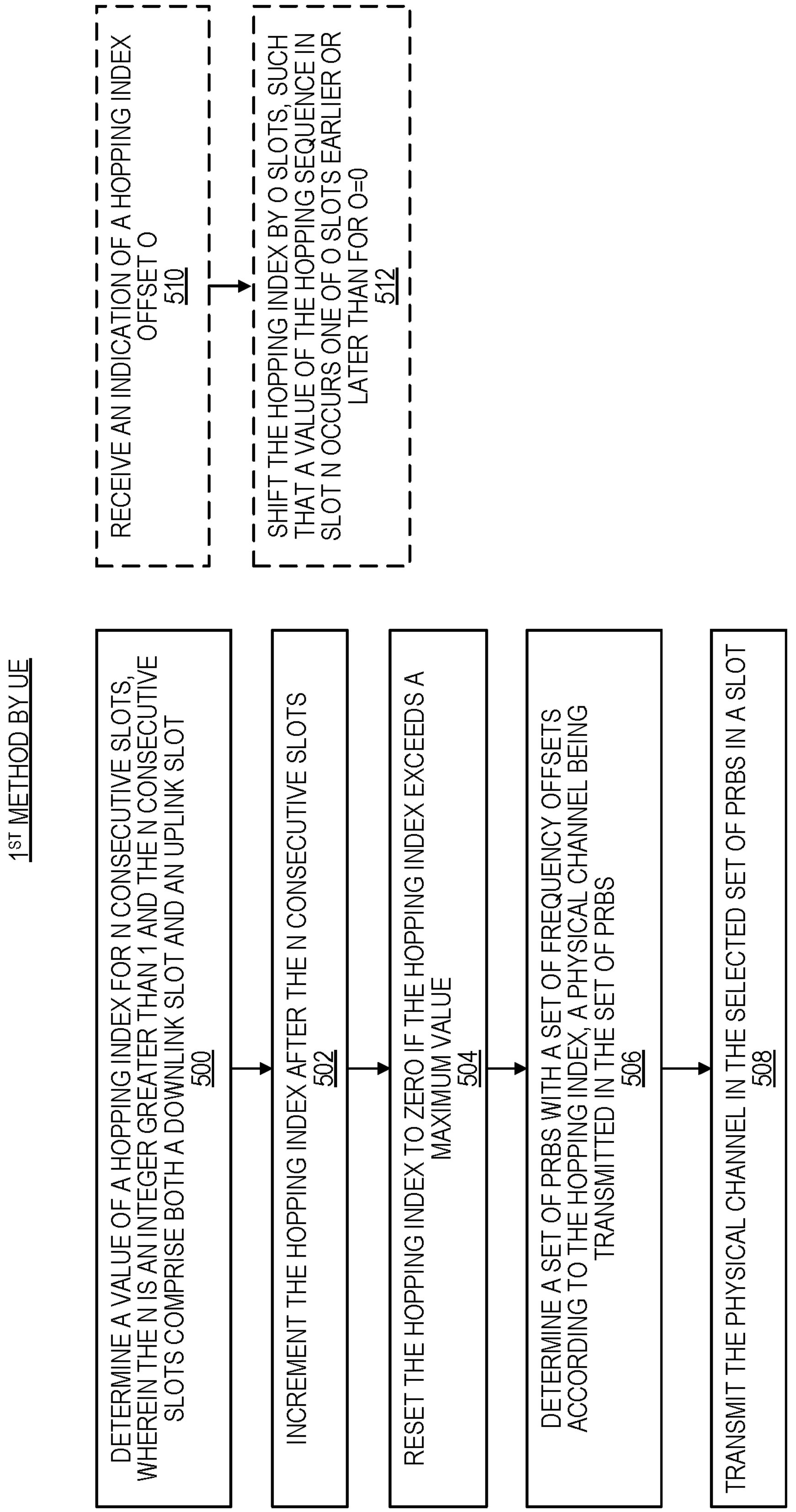
FIG. 5A illustrates a first method performed by a UE according to some embodiments of the present disclosure.

In similar embodiments, the UE transmits a physical channel in different frequency domain resources over time. As illustrated in FIG. 5A, the UE determines a value of a hopping index for N consecutive slots, where N is an integer greater than 1, and where the N consecutive slots comprise both a downlink and an uplink slot (step 500). The UE increments the hopping index after the N consecutive slots and resets the hopping index to zero if it exceeds a maximum value (steps 502 and 504). The UE then determines a set of PRBs in which to transmit a physical channel from a set of frequency offsets according to the hopping index (step 506), and transmits the physical channel in the selected set of PRBs in a slot (step 508).

In other words, the UE determines a first value of the hopping index for a first set of N consecutive slots in step 500. After the first set of N consecutive slots to which the first value of the hopping index applies, the UE increments the hopping index to provide a second value of the hopping index that is applicable to the next set of N consecutive slots in step 502. This next set of N consecutive slots is referred to here as a second set of N consecutive slots. If the second value of the hopping index for the second set of N consecutive slots exceeds a maximum value, the UE resets the hopping index for the second set of N consecutive slots to zero in step 504 (i.e., sets the second value of the hopping index that is appliable to the second set of N consecutive slots to zero). Then, for an uplink slot within the second set of N consecutive slots in which the physical channel is to be transmitted, the UE determines a set of PRBs in which to transmit a physical channel from a set of frequency offsets according to the second value of the hopping index for the second set of N consecutive slots and transmits the physical uplink channel in the selected set of PRBs in the uplink slot.

It may be desirable to configure different frequency hopping offsets for different UEs, since this may allow the UEs to share the same set of PRBs, occupying them at different times, thereby allowing efficient use of PRBs for frequency hopping operation. In such cases, the UE may determine the frequency offset for a transmission by shifting the hopping index by an integer O, thereby advancing, or delaying the frequency hopping sequence. Different UEs may use different values of O and then share the same set of PRBs without transmitting in a given PRB simultaneously, enabling spectrally efficient operation while not increasing interference received by the network. Therefore, as illustrated in FIG. 5A, in some embodiments where the UE determines a value of a hopping index for N consecutive slots, optionally, the UE receives an indication of a hopping index offset O (step 510) and shifts the hopping index by O slots, such that a value of the hopping sequence in slot n occurs one of O slots earlier or later than for O=0 (zero) (step 512).

There are also other solutions to determine a frequency hopping pattern without directly using a slot number. One other solution is to hop according to a group of adjacent uplink slots, which in some cases may coincide with a time domain window. This solution has the benefit of being a simple pattern to specify. Furthermore, since the hopping pattern follows the TDD pattern, it can be common for all UEs in a cell, avoiding conflicting hopping between UEs in a cell.

Here, a group of adjacent uplink slots is the actual time domain window, also known as a sub-window, where the UE may maintain phase continuity. As discussed above, a working assumption was agreed in RAN1 #106e that the gNB may configure a time-domain window for joint channel estimation, but the time-domain window may be split into multiple sub-windows when the requirements of keeping phase continuity and power consistency are violated. The UE's determination of the start and the end of each configured time-domain window is based on semi-static factors, e.g. TDD UL/DL configuration, but splitting into sub-window may be more dynamic depending on open loop power control, timing advance adjustment, and even possibly temperature variations. So it may be beneficial to reset the frequency hopping offset at the beginning of each configured time-domain window.

Figure 5B:
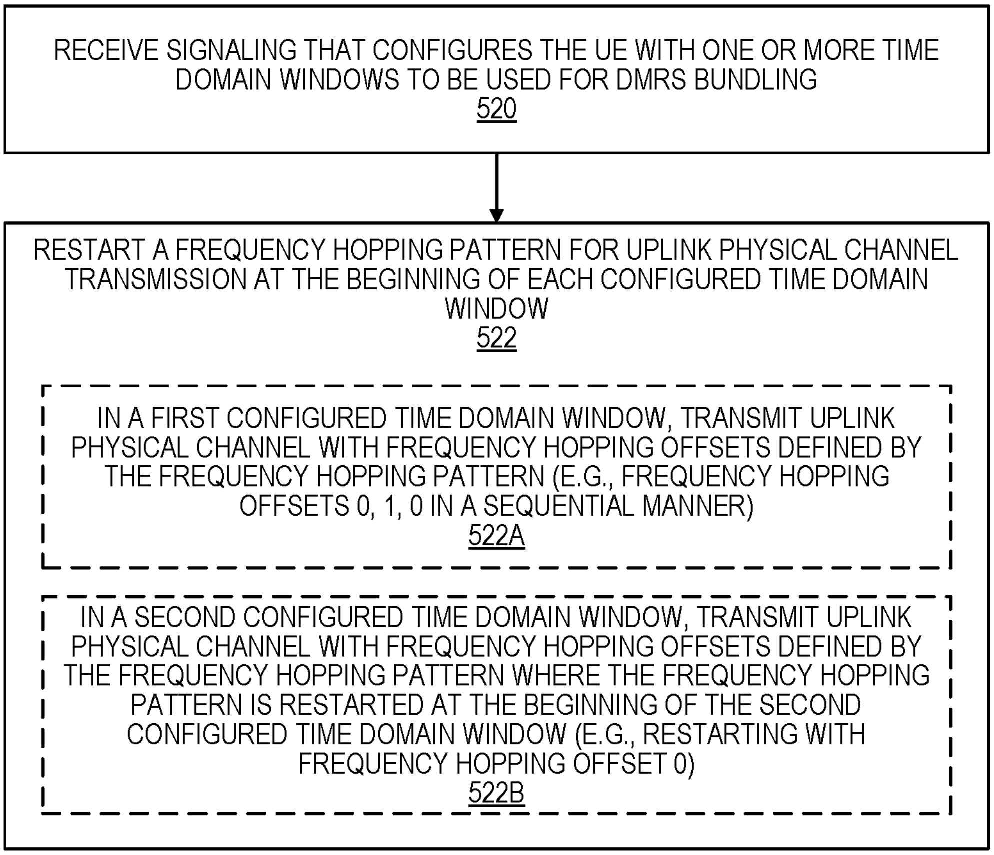
FIG. 5B illustrates a method performed by a UE according to another embodiment of the present disclosure.

Therefore, in one embodiment with two frequency hopping offsets, the first UL transmission in each configured window uses the same frequency hopping offset. In other words, as illustrated in FIG. 5B, the UE receives signaling configuring the UE with one or more time domain windows to be used for DMRS bundling (step 520), and the UE restarts the frequency hopping pattern at the beginning of each configured time domain window (step 522). For example, in one configured time domain window, the UE transmits with frequency hopping offsets 0, 1, 0 in a sequential manner (step 522A). It still, starts with offset 0 in the subsequent configured time domain windows, instead of using offset 1 (e.g., step 522B). In other words, in a first configured time domain window used for DMRS bundling, the UE transmits with frequency hopping offsets defined by a frequency hopping pattern (e.g., frequency hopping pattern defined by offsets 0, 1, 0 in a sequential manner (step 522A). Then, in a second configured time domain window used for DMRS bundling, the UE transmits with frequency hopping offsets defined by the frequency hopping pattern where the frequency hopping pattern is restarted at the beginning of the second configured time domain window (e.g., frequency hopping pattern defined by offsets 0, 1, 0 in a sequential manner) (step 522B).

When TDD patterns have some adjacent uplink slots between downlink slots and some uplink slots with no adjacent downlink slots, then frequency hopping patterns that hop every group may not produce an equal number of slots that occupy the same PRBs.

FIG. 6 illustrates an example that is provided with a common 10 slot long TDD pattern having 1 isolated uplink slot and 2 adjacent uplink slots in different 5 slot periods. As discussed in the above embodiments, it may be desirable to occupy the same PRBs over the two adjacent UL slots in order to allow continuity. FIG. 6 illustrates a variety of hopping patterns. The Rel-15 hopping pattern is illustrated in the row "Hop #," where the frequency hopping offset toggles between the two values of offset every other slot. In this case, there is no possibility to perform joint channel estimation across adjacent slots, since those slots are always at different hopping offsets. If, instead, a simple approach labeled "Hop every window" is used where the hop is every group (or 'window'), then considering an 8 slot repetition starting in slot 4 and ending in slot 28, 3 hops will be on PRBs indexed by '0' and 5 will be on PRBs indexed by '1'. This imbalance will degrade the diversity gain of the frequency hopping pattern.

If an alternative pattern is used, such as one of those identified in FIG. 6 with "Configured Hopping pattern 1 and 2" and identified by the patterns, {01100011} and {01101100}, respectively, then the 8 repetitions or available slots from slot 4 to 28 will have 4 slots each with PRB index 0 and 1, allowing a balanced pattern of offsets for the 8 repetitions. It may be noted that other lengths or starting points may be imbalanced, but the patterns generally achieve a more equal distribution of slots to hopped PRBs. For example, {11000111} and {11011000} may be suitable for 8 repetitions from slot 8 to 29. Furthermore, scheduling can be used to ensure that the UEs that need the best performance are scheduled with the best hopping patterns.

The example patterns are configured with one frequency hopping offset per slot in which the UE may transmit, and so correspond to an uplink slot or an available PUSCH slot. This has the benefit of reducing signaling overhead. For example, if the patterns also indicated downlink or special slots, there would be greater signaling overhead.

It is desirable for the frequency hopping pattern to be short, since longer patterns create more possible frequency positions and more time variation in which PRBs are occupied. These longer frequency hopping patterns can therefore complicate gNB scheduling. If the frequency hopping patterns are short, then the number of repetitions may be larger than the length of the frequency hopping pattern. In such cases, it is necessary to determine the frequency hopping offsets for the transmissions that go beyond the pattern length. One approach to do this is to repeat the sequence when the index of a transmission exceeds the pattern length. In other words, the UE would select a first frequency offset for a first transmission, a second offset is selected for a second transmission, and so on. For a repeated transmission #T that is beyond the frequency hopping pattern length P, i.e. with T=P+1, the UE selects the first frequency offset for transmission T, the second frequency offset for transmission T+1 and so on.

Figure 7A:
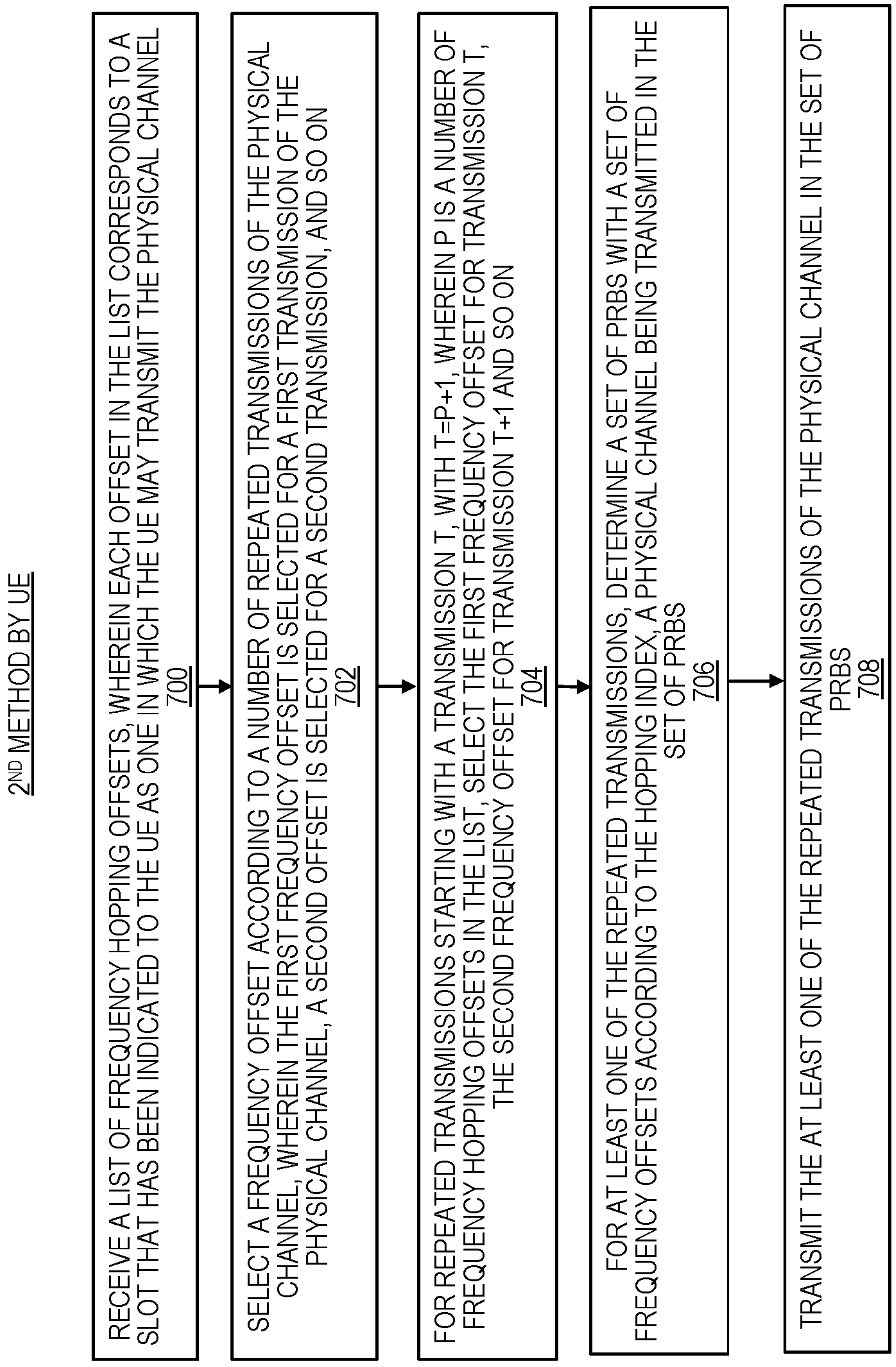
FIG. 7A and FIG. 7B illustrate the second method performed by the UE according to some embodiments of the present disclosure.

Therefore, in one embodiment, the UE transmits a physical channel in different frequency domain resources over time. As illustrated in FIG. 7A, the UE receives a list of frequency hopping offsets, where each offset in the list corresponds to a slot that has been indicated to the UE as one in which the UE may transmit the physical channel (step 700). The UE selects a frequency offset according to a number of repeated transmissions of the physical channel, wherein a first frequency offset is selected for a first transmission of the physical channel, a second offset is selected for a second transmission, and so on (step 702). For repeated transmissions starting with a transmission T, with T=P+1, where P is a number of frequency hopping offsets in the list, the UE selects the first frequency offset for transmission T, the second frequency offset for transmission T+1 and so on (step 704). For at least one of the repeated transmissions, the UE determines a set of PRBs in which to transmit a physical channel from a set of frequency offsets according to the hopping index (step 706); and transmits the at least one of the repeated transmissions of the physical channel in the set of PRBs (step 708).

As discussed above, it is desirable to configure different frequency hopping offsets for different UEs, since this may allow the UEs to share the same set of PRBs, occupying them at different times, thereby allowing efficient use of PRBs for frequency hopping operation. In such cases, the UE may select the frequency offset for a transmission according to its index in the list of frequency hopping offsets, where the selected offset is shifted by an integer O identifying the shift in the frequency hopping sequence.

Figure 7B:
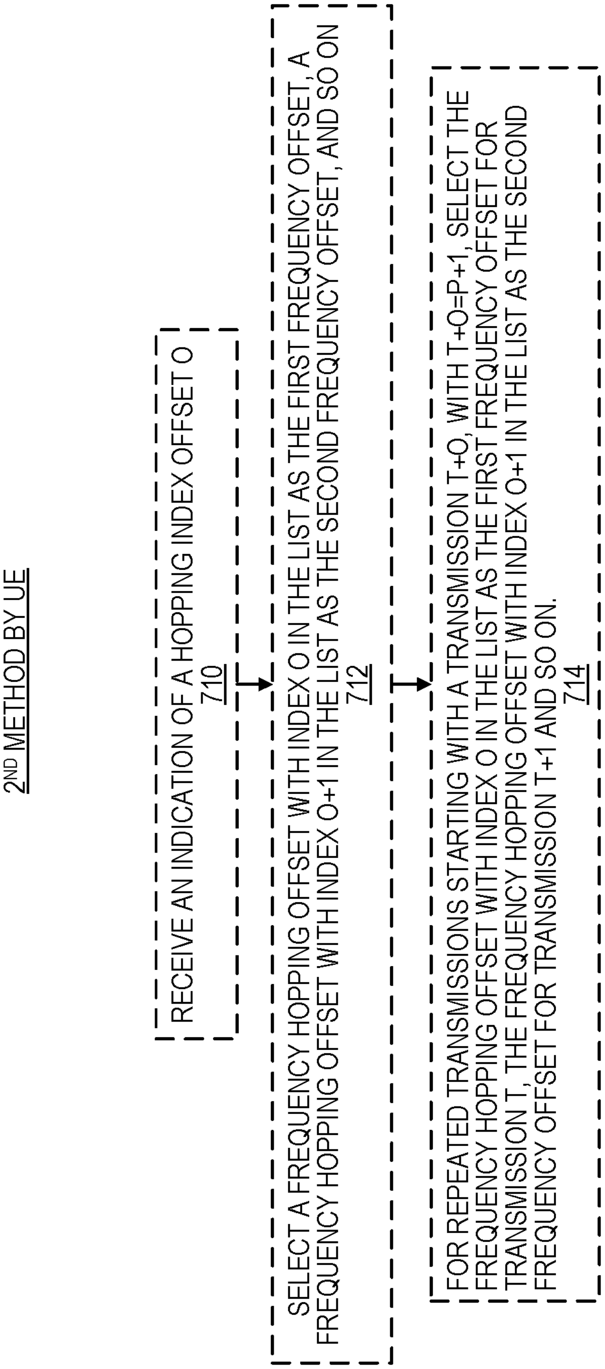

Therefore, as illustrated in FIG. 7B, in some embodiments where a list of frequency domain hopping offsets are configured to the UE, optionally, the UE receives an indication of a hopping index offset O (step 710). The UE selects a frequency hopping offset with index O in the list as the first frequency offset, a frequency hopping offset with index O+1 in the list as the second frequency offset, and so on (step 712). For repeated transmissions starting with a transmission T+O, with T+O=P+1, the UE selects the frequency hopping offset with index O in the list as the first frequency offset for transmission T, the frequency hopping offset with index O+1 in the list as the second frequency offset for transmission T+1 and so on (step 714).

In other words, the process of FIGS. 7A and 7B may be described as follows. The UE receives (in step 700) a list of frequency hopping offsets, wherein each frequency hopping offset in the list corresponds to a slot that has been indicated to the UE as one in which the UE may transmit a physical channel. In steps 702 and 704 (or likewise; step 712 and 714 for when there is an offset O), the UE selects a frequency hopping, offset for each repeated transmission of physical channel as follows. Note that the repeated transmissions are index here using an index "i" where i=1, . . . $N_{repetitions}$ and $N_{repetitions}$ is the number of repetitions of the physical channel which, for this example, is greater than P where P is the number of frequency hopping offsets in the list.

For each i-th repeated transmission for i=1 . . . P−O:
- the UE selects the (i+O)th frequency hopping offset from the list as a frequency hopping offset for the i-th repeated transmission.

For each i-th repeated transmission for i>P−O:
- the UE selects the (i+O−P)th frequency hopping offset from the list as a frequency hopping offset for the i-th repeated transmission.

Note that there may or may not be an offset, depending on the particular embodiment (see, e.g., steps 702 and 704 for no offset and steps 712 and 714 for an offset). The case of no offset (i.e., steps 702 and 704) is equivalent to O=0. Then, in step 706, for at least one of the repeated transmissions of the physical channel, the UE determines a set of PRBs in which to transmit the repeated transmission from a set of frequency offsets according to a frequency hopping index, where the frequency hopping index is a function of the frequency hopping offset selected for that repeated transmission in step 702 or 704. The UE transmits the at least one repeated transmission of the physical channel in the determined set of PRBs in step 708.

Similar to other embodiments above, it may be beneficial to reset the frequency hopping pattern, for example, to align with dynamic TDD operation.

Therefore, in some embodiments where a list of frequency domain hopping offsets are configured to the UE, the UE selects the first frequency offset as the first frequency offset for a transmission T', the second frequency offset as a second frequency offset for transmission T'+1, and so on, in response to receiving an indication to reset a frequency hopping pattern.

In one embodiment, the frequency hopping patterns may be indicated by a binary bit string or its corresponding decimal value. 0 or 1 starting from the Most Significant Bit (MSB) of the bit sequence indicates the different frequency hopping offset to be used for the transmission in the first, second, etc., physical or available slot.

In the aforementioned embodiments, for PUSCH repetition with the repetition factor 8, the possible bit strings that the gNB can configure are {01100011, 01101100, 11000111, 11011000} or {99,108,199, 216}.

For Rel-17 PUSCH repetition based on available slot, each bit of the bit string can represent the frequency hopping offset in the corresponding available slot. Rel-15 and Rel-16 PUSCH repetition with repetition factor K has no such concept of available slot, so the bit string indicates the frequency hopping offset in the K consecutive slots.

In another embodiment, if one frequency hopping pattern is configured to the UE by higher layers, the DCI indicates whether a frequency hopping based on this pattern is enabled or disabled. If more than one frequency hopping patterns are configured to the UE by the higher layers, the DCI may indicate which one is enabled.

It may be desirable for a frequency hopping pattern to vary with a TDD UL/DL pattern that is semi-statically configured. A reason that only one frequency hopping pattern is enough for that UE is that, if a dynamic Slot Format Indicator (SFI) is not considered, one frequency hopping pattern may reach the balanced distribution among hops according to a particular TDD pattern and a PUSCH starting slot (which may be identified by the parameter K2). If the time domain resource allocation table contains different K2 values, multiple patterns may be considered, or one pattern together with different offsets for the first bit in the bit string to start with.

In another embodiment, the length of the bit string for the frequency hopping pattern can be the same or different from the number of repetitions for PUSCH repetition. If the length of the bit string is larger than the number of repetitions K, the UE determines frequency hopping offsets according to the first K bits from the MSB. Otherwise, the bit string is repeatedly used. In some cases, if the frequency hopping pattern is configured by the higher layers, and the number of repetitions is indicated in the DCI, it is possible that the length of bit sequence for hopping pattern is different from the DCI indicated number of repetitions.

In another embodiment, if a decimal value is used to indicate frequency hopping pattern, its maximum value is configured or predetermined. For example, if 3 is indicated as the hopping pattern, UE can figure out the pattern is {0011} for the maximum number of 15/{1111} or {00000011} for the maximum number of 255/{11111111}. An example of predetermination is that the maximum decimal value is based on a bit sequence of all 1 which length equals the number of repetitions.

In another embodiment, an offset for one frequency hopping pattern may be configured indicating which bit from the MSB of the bit string for UE to start using. For example, the Offset 0, 1 . . . indicates that the UE starts from the MSB, the second . . . bit of the bit string to use.

Specifying the hopping pattern to align with the TDD pattern as above can be based on the structure of the TDD pattern. As disclosed above, the TDD pattern in Rel-15/16 occurs with a periodicity of 20 ms or less. The example TDD pattern above corresponds to 20 ms with 30 kHz subcarrier spacing.

The frequency hopping counter may be incremented for each UL slot in the frequency hopping pattern and then reset after a period of time containing a number of complete instances of the TDD pattern. The Rel-15/16 parameter dl-UL-TransmissionPeriodicity from 3GPP TS 38.331 V16.5.0 used to set the TDD pattern periodicity could be used to set the periodicity of the frequency hopping pattern, for example, by setting the frequency hopping pattern length equal to "pattern1" if "pattern2" is not configured, and the sum of the values of dl-UL-TransmissionPeriodicity for "pattern1" and "pattern2" if "pattern2" is configured. The frequency hopping counter would then have a value for each slot in the frequency hopping pattern, although the frequency hopping values may only be defined for slots available for UL transmission.

A frequency hopping offset could be configured for each value of the frequency hopping counter. Such an offset could be quantized to, for example, two or four values, which would require one or two bits to identify in signaling. These values could be identified by a modified version of the Rel-15/16 frequency hopping offset parameter frequency-HoppingOffsetLists that allows the range of offsets to include 0 PRBs, i.e. one that is defined as follows:

```
frequency HoppingOffsetLists-r17          SEQUENCE (SIZE (1..4)) OF
INTEGER (0.. maxNrofPhysicalResourceBlocks-1)
```

In this way, a zero value can be selected for the UE to not hop away from the starting PRB, and each hop can be set to any one of the allowed values in frequencyHoppingOffsetLists-r17.

The configured hopping pattern can be indicated by a list of hopping offsets that contains an entry for each hopping counter value (with one hopping counter value per UL slot), for example:

```
frequency HoppingPattern-r17          SEQUENCE (SIZE
(1..maxHoppingPatternLength)) OF INTEGER (0..3)
```

To produce the 9 slot long example hopping pattern {0 1 1 0 0 0 1 1 1} above, we need to use three repetitions of the TDD pattern, since there are 3 UL slots per TDD pattern. frequencyHoppingPattern-r17 can be a 9 element sequence: frequencyHoppingPattern-r17:=[0 1 1 0 0 0 1 1 1].

Therefore, in one embodiment, the UE is configured with a hopping pattern, wherein the hopping offset is configured for each slot of a set of slots available for UL transmission, where the length of the hopping pattern is a multiple of the number of slots available for UL transmission, and where the set of slots occurs with a periodicity that is a multiple of a TDD UL-DL pattern.

The UEs not supporting joint channel estimation will also need to hop with the same pattern, so the frequency hopping pattern should be available whether DMRS bundling (or termed differently, joint channel estimation) across slots is configured or not, and regardless of whether the UE supports DMRS bundling. Such UEs should identify the capability for the frequency hopping pattern, without the need to identify capability for DMRS bundling (or equivalently joint channel estimation or phase continuity maintenance capability).

Therefore, in some embodiments, the UE indicates capability for the hopping pattern configured for each slot of a set of slots available for UE transmission above, independent of whether the UE indicates capability to maintain phase continuity among uplink transmissions in different slots.

In FDD operation, it may be possible that the UE is configured such that it is required to maintain continuity over a subset of UL transmissions, such as a subset of a number of Type A PUSCH repetitions. In this case, when the frequency hopping is used, it may be desirable to maintain continuity across a number of consecutive slots, which requires them to occupy the same frequency hopping offset. This again conflicts with Rel-15/16 frequency hopping, which changes the frequency hopping offset at every slot. Therefore, there is a need for a new frequency hopping pattern for both FDD and TDD to support joint channel estimation.

The above embodiments of defining a hopping pattern that applies to all UEs in the cell and uses frame timing also applies to FDD, since common hopping timing is beneficial for UEs in a cell. The hopping pattern periodicity will not depend on the TDD DL-UL pattern, but should be a multiple of the configured window duration, if it is used by the UE. If the duration is not used, then the network can still adjust the hopping pattern according to tradeoffs in the amount of gain from joint channel estimation vs frequency hopping. In scenarios where joint channel estimation gain is limited, it may be better to hop more frequently to benefit from diversity from frequency hopping. When there is less diversity, it may be better to maximize joint channel estimation gain, and set the pattern such that the UE stays longer on the same subcarriers.

The same basic approach for TDD can be used for FDD. A pattern of frequency hopping with a hopping offset configured for each hop and for each UL transmission can be defined. The pattern should have limited length to simplify determining the hopping pattern timing as well as network scheduling. It is also desirable that the pattern support a maximum number of repetitions. A 40 ms periodicity would allow a pattern length of 40 for 15 kHz subcarrier spacing, and this is longer than required for the 32 repetitions that have been agreed to be supported in Rel-17.

Therefore, in some embodiments, the UE is configured with a hopping pattern, wherein the hopping offset is configured for each slot of a set of slots, where the length of the hopping pattern is an integer divisor of a predetermined number of slots, such as the number of slots in a in a radio frame, or a predetermined number of radio frames, such as two, three, or four radio frames. In other words, in some embodiments, the UE is configured with multiple hopping offsets wherein each hopping offset is configured for each slot of a set of slots, where the length of the set of slots for which the hopping offset is configured is an integer divisor of a predetermined number of slots, such as the number of slots in a radio frame, or a predetermined number of radio frames, such as two, three, or four radio frames.

ADDITIONAL DESCRIPTION

Figure 8:
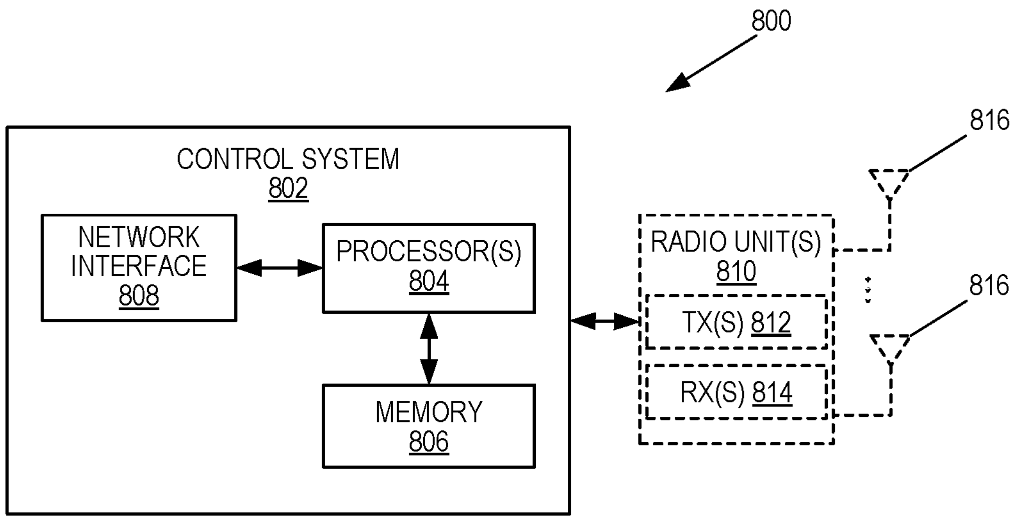
FIG. 8 is a schematic block diagram of a radio access node according to some embodiments of the present disclosure.

FIG. 8 is a schematic block diagram of a radio access node 800 according to some embodiments of the present disclosure. Optional features are represented by dashed boxes. The radio access node 800 may be, for example, a base station 202 or 206 or a network node that implements all or part of the functionality of the base station 202 or gNB described herein. As illustrated, the radio access node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, the radio access node 800 may include one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of a radio access node 800 as described herein. In some embodiments, the function(s) are implemented in software that is stored, e.g., in the memory 806 and executed by the one or more processors 804.

Figure 9:
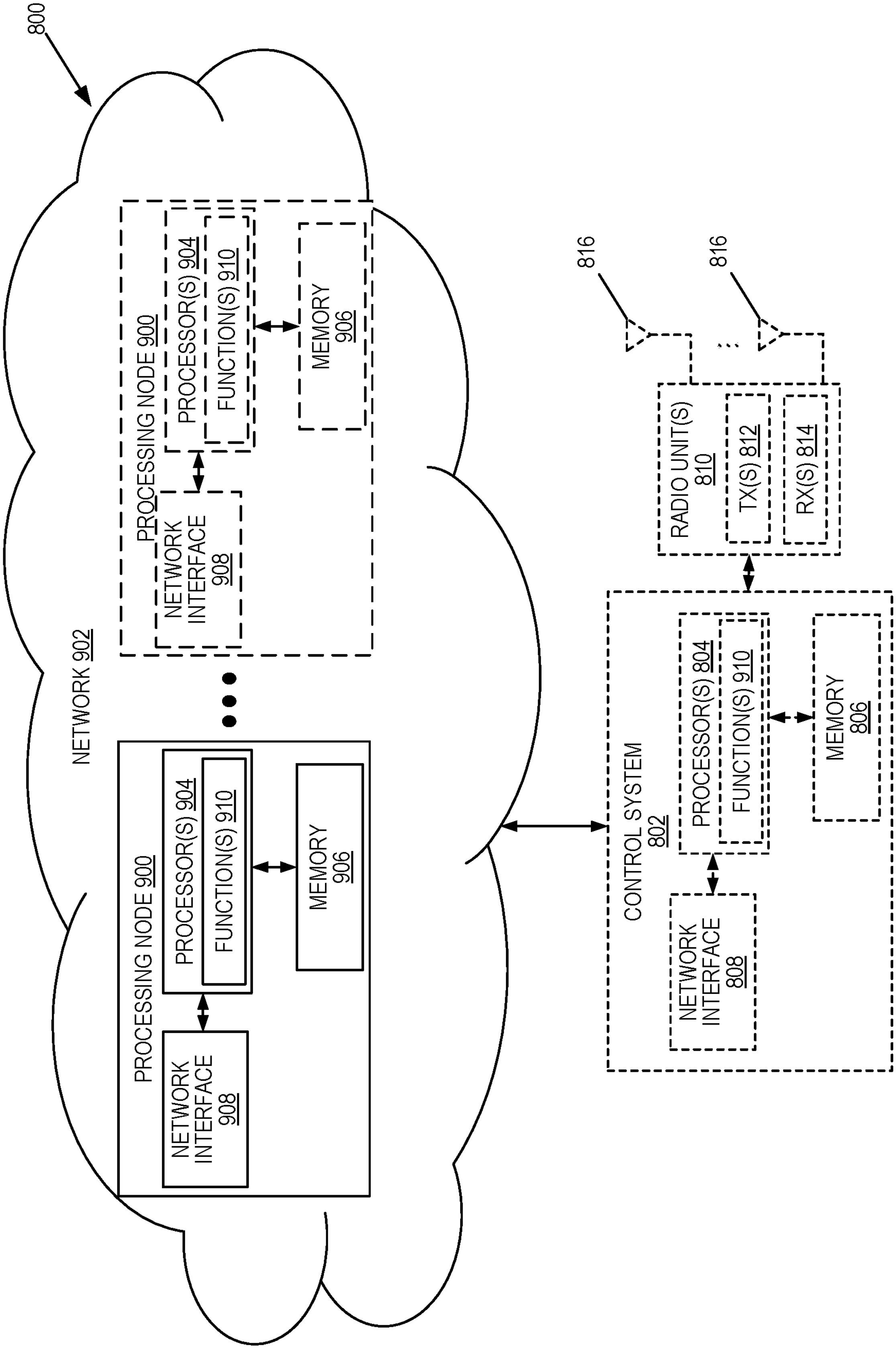
FIG. 9 is a schematic block diagram that illustrates a virtualized embodiment of the radio access node of FIG. 8 according to some embodiments of the present disclosure.

FIG. 9 is a schematic block diagram that illustrates a virtualized embodiment of the radio access node 800 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 800 in which at least a portion of the functionality of the radio access node 800 is implemented as a virtual component(s) (e.g., via a virtual machine(s) executing on a physical processing node(s) in a network(s)). As illustrated, in this example, the radio access node 800 may include the control system 802 and/or the one or more radio units 810, as described above. The control system 802 may be connected to the radio unit(s) 810 via, for example, an optical cable or the like. The radio access node 800 includes one or more processing nodes 900 coupled to or included as part of a network(s) 902. If present, the control system 802 or the radio unit(s) are connected to the processing node(s) 900 via the network 902. Each processing node 900 includes one or more processors 904 (e.g., CPUs, ASICs, FPGAs, and/or the like), memory 906, and a network interface 908.

In this example, functions 910 of the radio access node 800 described herein are implemented at the one or more processing nodes 900 or distributed across the one or more processing nodes 900 and the control system 802 and/or the radio unit(s) 810 in any desired manner. In some particular embodiments, some or all of the functions 910 of the radio access node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of radio access node 800 or a node (e.g., a processing node 900) implementing one or more of the functions 910 of the radio access node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
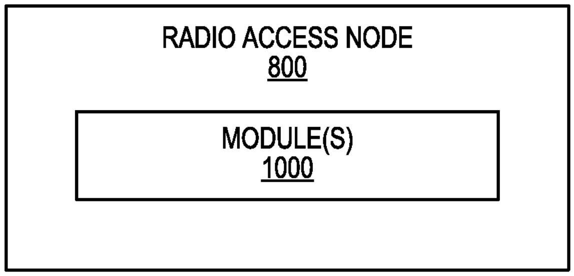
FIG. 10 is a schematic block diagram of the radio access node of FIG. 8 according to some other embodiments of the present disclosure.

FIG. 10 is a schematic block diagram of the radio access node 800 according to some other embodiments of the present disclosure. The radio access node 800 includes one or more modules 1000, each of which is implemented in software. The module(s) 1000 provide the functionality of the radio access node 800 described herein. This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Figure 11:
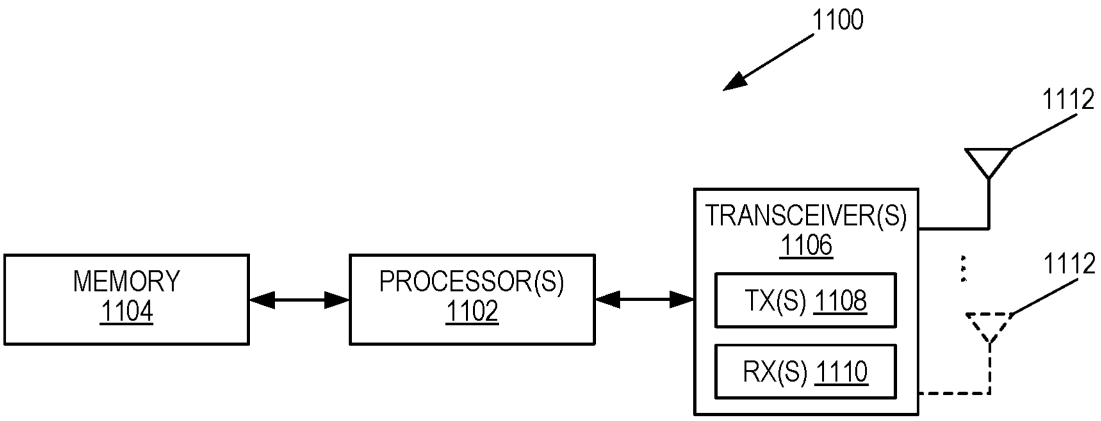
FIG. 11 is a schematic block diagram of the UE according to some embodiments of the present disclosure.

FIG. 11 is a schematic block diagram of a wireless communication device 1100 according to some embodiments of the present disclosure. As illustrated, the wireless communication device 1100 includes one or more processors 1102 (e.g., CPUs, ASICs, FPGAs, and/or the like), memory 1104, and one or more transceivers 1106 each including one or more transmitters 1108 and one or more receivers 1110 coupled to one or more antennas 1112. The transceiver(s) 1106 includes radio-front end circuitry connected to the antenna(s) 1112 that is configured to condition signals communicated between the antenna(s) 1112 and the processor(s) 1102, as will be appreciated by on of ordinary skill in the art. The processors 1102 are also referred to herein as processing circuitry. The transceivers 1106 are also referred to herein as radio circuitry. In some embodiments, the functionality of the wireless communication device 1100 described above may be fully or partially implemented in software that is, e.g., stored in the memory 1104 and executed by the processor(s) 1102. Note that the wireless communication device 1100 may include additional components not illustrated in FIG. 11 such as, e.g., one or more user interface components (e.g., an input/output interface including a display, buttons, a touch screen, a microphone, a speaker(s), and/or the like and/or any other components for allowing input of information into the wireless communication device 1100 and/or allowing output of information from the wireless communication device 1100), a power supply (e.g., a battery and associated power circuitry), etc.

In some embodiments, a computer program including instructions which, when executed by at least one processor, causes the at least one processor to carry out the functionality of the wireless communication device 1100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
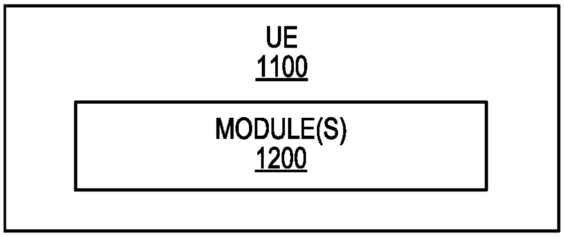
FIG. 12 is a schematic block diagram of the UE of FIG. 11 according to some other embodiments of the present disclosure.

FIG. 12 is a schematic block diagram of the wireless communication device 1100 according to some other embodiments of the present disclosure. The wireless communication device 1100 includes one or more modules 1200, each of which is implemented in software. The module(s) 1200 provide the functionality of the wireless communication device 1100 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Those skilled in the art will recognize improvements and modifications to the embodiments of the present disclosure. All such improvements and modifications are considered within the scope of the concepts disclosed herein.

The invention claimed is:

1. A method implemented in a User Equipment, UE, of transmitting a physical channel in different frequency domain resources over time, the method comprising:

determining a value of a hopping index for a first set of N consecutive slots, wherein the N is an integer greater than 1;

after the N consecutive slots, incrementing the value of the hopping index for a second set of N consecutive slots;

for an uplink slot within the second set of N consecutive slots in which a physical uplink channel is to be transmitted:

determining a set of physical resource blocks, PRBs, in which to transmit the physical channel from a set of frequency offsets according to the value of the hopping index for the second set of N consecutive slots, wherein the value of the hopping index is defined as:

$$n_{hop} = \lfloor n_{s,f}^{\mu}/N \rfloor \bmod L$$

where $n_{hop}$ is the hopping index, $$n_{s,f}^{\mu}$$

is a physical slot number of a slot to which the hopping index applies, N is the number of consecutive slots to which the hopping index applies, and L−1 is a maximum value of the hopping index where the hopping index is a value in a range of and including 0 to L−1; and transmitting the physical uplink channel in the selected set of PRBs in the uplink slot.

2. The method of claim 1, wherein the first set of N consecutive slots and/or the second set of N consecutive slots comprise both a downlink slot and an uplink slot.

3. The method of claim 1, wherein the value of the hopping index is a function of physical slot number.

4. The method of claim 3, wherein the value of the hopping index is further a function of a defined or configured offset.

5. The method of claim 4, wherein the hopping index changes once every N consecutive time slots, the N consecutive time slots comprise both a downlink slot and an uplink slot, and the set of frequency offsets includes L values corresponding to L possible frequency offsets.

6. The method of claim 4, wherein each frequency offset is configured each slot of a set of N slots, where N is an integer divisor of a predetermined number of slots.

7. The method of claim 6, wherein the predetermined number of slots is a number of slots in a radio frame or a number of slots in a predetermined number of radio frames.

8. The method of claim 1, wherein N has a value that is a submultiple of a number of slots in a configured Time Division Duplexing, TDD, Uplink-Downlink pattern.

9. The method of claim 1 wherein the UE indicates the capability of the UE for a frequency hopping pattern configured for each slot of multiple slots that have been indicated to the UE independent of whether the UE indicates a capability of the UE to maintain phase continuity among uplink transmissions in different slots.

10. A User Equipment, UE, for transmitting a physical channel in different frequency domain resources over time, the UE comprising processing circuitry configured to cause the UE to:

determine a value of a hopping index for a first set of N consecutive slots, wherein the N is an integer greater than 1;

after the N consecutive slots, increment the value of the hopping index for a second set of N consecutive slots;

for an uplink slot within the second set of N consecutive slots in which a physical uplink channel is to be transmitted:

determine a set of physical resource blocks, PRBs, in which to transmit the physical channel from a set of frequency offsets according to the value of the hopping index for the second set of N consecutive slots, wherein the value of the hopping index is defined as:

$$n_{hop} = \lfloor n_{s,f}^{\mu}/N \rfloor \bmod L$$

where $n_{hop}$ is the hopping index, $$n_{s,f}^{\mu}$$

is a physical slot number of a slot to which the hopping index applies, N is the number of consecutive slots to which the hopping index applies, and L−1 is a maximum value of the hopping index where the hopping index is a value in a range of and including 0 to L−1; and transmit the physical uplink channel in the selected set of PRBs in the uplink slot.

11. A User Equipment, UE, for transmitting a physical channel in different frequency domain resources over time, the UE comprising:

one or more transmitters;

one or more receivers; and processing circuitry associated with the one or more transmitters and the one or more receivers, the processing circuitry configured to cause the UE to:

determine a value of a hopping index for a first set of N consecutive slots, wherein the N is an integer greater than 1;

after the N consecutive slots, increment the value of the hopping index for a second set of N consecutive slots;

for an uplink slot within the second set of N consecutive slots in which a physical uplink channel is to be transmitted:

determine a set of physical resource blocks, PRBs, in which to transmit the physical channel from a set of frequency offsets according to the value of the hopping index for the second set of N consecutive slots, wherein the value of the hopping index is defined as:

$$n_{hop} = \lfloor n^{\mu}_{s,f}/N \rfloor \bmod L$$

where $n_{hop}$ is the hopping index, $$n^{\mu}_{s,f}$$

is a physical slot number of a slot to which the hopping index applies, N is the number of consecutive slots to which the hopping index applies, and L−1 is a maximum value of the hopping index where the hopping index is a value in a range of and including 0 to L−1; and transmit the physical uplink channel in the selected set of PRBs in the uplink slot.

* * * * *